(12) United States Patent
Tartan et al.

(10) Patent No.: US 12,375,557 B2
(45) Date of Patent: Jul. 29, 2025

(54) MULTI-LAYER COMMUNICATION NETWORK

(71) Applicant: nChain Licensing AG, Zug (CH)

(72) Inventors: Chloe Tartan, London (GB); Alexander MacKay, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 17/924,960

(22) PCT Filed: Apr. 22, 2021

(86) PCT No.: PCT/EP2021/060506
§ 371 (c)(1),
(2) Date: Nov. 11, 2022

(87) PCT Pub. No.: WO2021/228528
PCT Pub. Date: Nov. 18, 2021

(65) Prior Publication Data
US 2023/0199063 A1    Jun. 22, 2023

(30) Foreign Application Priority Data
May 15, 2020   (GB) ..................... 2007191

(51) Int. Cl.
*H04L 9/32*     (2006.01)
*H04L 9/00*     (2022.01)
(Continued)

(52) U.S. Cl.
CPC ............ *H04L 67/1034* (2013.01); *H04L 9/32* (2013.01); *H04L 9/50* (2022.05); *H04L 67/108* (2013.01); *G16Y 10/75* (2020.01)

(58) Field of Classification Search
CPC ... H04L 667/1034; H04L 67/108; H04L 9/50; H04L 9/32
(Continued)

(56) References Cited

U.S. PATENT DOCUMENTS 10,425,230 B1    9/2019  Tang et al.
10,536,537 B1*   1/2020  Le .......................... G06Q 20/386
(Continued)

FOREIGN PATENT DOCUMENTS

CN    109617922    4/2019
GB     2588659     5/2021
(Continued)

OTHER PUBLICATIONS

PCT/EP2021/060506 International Search Report and Written Opinion dated Jun. 30, 2021, 15 pages.
(Continued)

*Primary Examiner* — Khanh Q Dinh
(74) *Attorney, Agent, or Firm* — Messner Reeves LLP

(57) ABSTRACT

A system comprising a layered network, wherein the layered network comprises a plurality of LN nodes arranged in an ordered set of layers, the ordered set of layers comprising, in order, a core layer comprising a plurality of master nodes each connected to one or more blockchain nodes of a blockchain network, one or more intermediate layers comprising a respective set of intermediate nodes, and a device layer comprising a set of end devices, wherein: each master node is configured to control a respective subset of intermediate nodes; a first master node is configured to control a first subset of intermediate nodes; a second master node is configured to control a second subset of intermediate nodes; and each intermediate node is configured to control a respective subset of end devices.

17 Claims, 14 Drawing Sheets

(51) Int. Cl.
*H04L 67/1034* (2022.01)
*H04L 67/1074* (2022.01)
*G16Y 10/75* (2020.01)

(58) Field of Classification Search
USPC .............................. 709/203, 220, 224–228
See application file for complete search history.

(56) References Cited

U.S. PATENT DOCUMENTS

| | | | |
|---|---|---|---|
| 10,812,975 B1 * | 10/2020 | Easwar Prasad | ..... H04L 9/3239 |
| 10,911,243 B1 | 2/2021 | Griffin et al. | |
| 11,025,627 B2 | 6/2021 | Li et al. | |
| 11,568,064 B2 * | 1/2023 | Krishnaswamy | ..... H04L 9/0637 |
| 2010/0036956 A1 | 2/2010 | Nishikawa | |
| 2016/0292672 A1 | 10/2016 | Fay et al. | |
| 2018/0039667 A1 | 2/2018 | Pierce et al. | |
| 2018/0191503 A1 * | 7/2018 | Alwar | ................... H04L 9/3242 |
| 2018/0253702 A1 | 9/2018 | Dowding | |
| 2018/0253703 A1 | 9/2018 | Smith et al. | |
| 2018/0293583 A1 | 10/2018 | Rhie et al. | |
| 2019/0199535 A1 | 6/2019 | Falk | |
| 2019/0199787 A1 | 6/2019 | Carver et al. | |
| 2019/0288850 A1 * | 9/2019 | Beecham | ............ G06F 21/6209 |
| 2019/0332921 A1 * | 10/2019 | Rodriguez | ............ H04L 9/0643 |
| 2019/0354367 A1 | 11/2019 | Rodriguez Bravo et al. | |
| 2020/0021569 A1 * | 1/2020 | Simons | ................... H04L 63/12 |
| 2020/0027005 A1 * | 1/2020 | Harrison | ................... G06N 5/02 |
| 2020/0099529 A1 | 3/2020 | Chan et al. | |
| 2020/0144158 A1 * | 5/2020 | Seo | ..................... H01L 21/6835 |
| 2020/0177373 A1 * | 6/2020 | Komandur | ............ H04L 9/0894 |
| 2020/0204350 A1 | 6/2020 | Kramer | |
| 2020/0213329 A1 * | 7/2020 | Simons | ................... G06F 21/33 |
| 2020/0218815 A1 * | 7/2020 | Haque | ................... G06F 21/645 |
| 2020/0272945 A1 * | 8/2020 | Manamohan | .......... G06N 20/00 |
| 2020/0356397 A1 * | 11/2020 | Kumatagi | ............... G06F 9/455 |
| 2021/0083844 A1 * | 3/2021 | Knuhtsen | ............... H04L 9/0637 |
| 2021/0144158 A1 * | 5/2021 | Gerards | ............... H04L 9/3239 |
| 2021/0160067 A1 | 5/2021 | Liu et al. | |
| 2021/0211451 A1 * | 7/2021 | Alsharif | .................. H04L 63/12 |
| 2021/0226770 A1 * | 7/2021 | Huan | ..................... H04L 63/06 |
| 2022/0052988 A1 * | 2/2022 | Gadnis | ................ H04L 63/0464 |
| 2022/0215471 A1 * | 7/2022 | Simpson | ............ G01C 21/3407 |
| 2022/0393891 A1 | 12/2022 | MacKcay et al. | |
| 2023/0089134 A1 * | 3/2023 | Wang | ..................... H04L 9/3247 713/150 |
| 2023/0098246 A1 * | 3/2023 | Simpson | ................ G06Q 50/30 707/703 |

FOREIGN PATENT DOCUMENTS

| | | | | |
|---|---|---|---|---|
| GB | 2588660 | | 5/2021 | |
| GB | 2592211 | | 8/2021 | |
| GB | 2594684 | | 10/2021 | |
| JP | 2005117174 | A | 4/2005 | |
| JP | 2018195154 | A | 12/2018 | |
| JP | 2019522264 | A | 8/2019 | |
| JP | 2019528590 | A | 10/2019 | |
| JP | 2020505799 | A | 2/2020 | |
| JP | 2020507222 | A | 3/2020 | |
| KR | 102569409 B1 * | | 8/2023 | ......... G06F 9/45558 |
| WO | 2010149185 | | 12/2010 | |
| WO | 2017145010 | A1 | 8/2017 | |
| WO | 2018222066 | A1 | 12/2018 | |
| WO | 2019108438 | A1 | 6/2019 | |
| WO | 2020053565 | A1 | 3/2020 | |
| WO | 2021059057 | A1 | 4/2021 | |
| WO | 2022037879 | A1 | 2/2022 | |

OTHER PUBLICATIONS

GB2007191.6 Combined Search and Examination Report dated Feb. 12, 2021, 12 pages.

Novo Oscar: Blockchain Meets IoT: An Architecture for Scalable Access Management in IoT, IEEE Internet of Things Journal, IEEE, USA, vol. 5, No. 2, Apr. 1, 2018 (Apr. 1, 2018), pp. 1184-1195, XP011680882, DOI: 10.1109/JIOT.2018.2812239 figures 2,3, section II.

Lei Hang et al: "Design and Implementation of an Integrated IoT Blockchain Platform for Sensing Data Integrity", Sensors, vol. 19, No. 10, May 14, 2019 (May 14, 2019), p. 2228, XP055765284, DOI: 10.3390/s19102228 figure 11 the whole document.

Hu Tao et al: "A distributed decision mechanism for controller load balancing based on switch migration in SDN", China Communications, China Institute of Communications, Piscataway, NJ, USA, vol. 15, No. 10, Oct. 1, 2018 (Oct. 1, 2018), pp. 129-142, XP011690935, ISSN: 1673-5447, DOI: 10.1109/CC.2018.8485475 [retrieved on Oct. 5, 2018] section IV; figures 1-5.

"Android smartphones 'used for botnet', researchers say," BBC News, Technology, Jul. 5, 2012, 2 pages, Retrieved from the Internet: URL: https://www.bbc.co.uk/news/technology-18720565.

Combined Search and Examination Report for Application No. GB2003641.4, dated Sep. 16, 2020, 8 pages.

Djilali H. B. et al., "Efficient Distributed Authentication and Access Control System Management for Internet of Things Using Blockchain", Advances in Databases and Information Systems, 2019, pp. 51-60.

Gudgeon L., et al., "SoK: Off The Chain Transactions", IACR International Association for Cryptologic Research, Apr. 3, 2019, vol. 20190410:001850, 44 pages, Retrieved from the Internet: URL: http://eprint.iacr.org/2019/360.pdf.

International Search Report and Written Opinion for International Application No. PCT/IB2021/051160, dated Apr. 26, 2021, 22 pages.

Kaspersky, "What is a Botnet?, Preventing Botnet Attacks," Mar. 12, 2020, pp. 1-5.

Liu C., et al., "A Recoverable Hybrid CC Botnet," 6th International Conference on Malicious and Unwanted Software, IEEE, Institute of Computing Technology, Chinese Academy of Sciences, 2011, pp. 110-118.

Poon J., et al., "The Bitcoin Lightning Network: Scalable Off-Chain Instant Payments", Jan. 14, 2016, 59 pages, Retrieved from the Internet: URL: https://lightning.network/lightning-network-paper.pdf.

Vincent J., "Could Your Fridge Send You Spam? Security Researchers Report 'Internet of Things' Botnet," Independent, Jan. 20, 2014, pp. 1-5.

Westervelt R., "Botnet Masters Turn to Google, Social Networks to Avoid Detection," Tech Target, Nov. 10, 2009, 2 pages.

Wikipedia, "DDoS Mitigation," The Free Encyclopedia, Mar. 13, 2020, pp. 1-2, Retrieved from the Internet: URL: https://en.wikipedia.org/wiki/DDoS_mitigation.

Wuille P., "Hierarchical Deterministic Wallets," Github, Feb. 11, 2012, 15 pages, Retrieved from the Internet: URL: https://github.com/bitcoin/bips/blob/master/bip-0032.mediawiki.

Zhong L., et al., "A Flexible Instant Payment System Based on Blockchain", Advances in Databases and Information Systems, May 30, 2019, pp. 289-306.

\* cited by examiner

Figure 5a

| Tx1 (partial) | | | |
|---|---|---|---|
| Inputs | | Outputs | |
| Value | Input Script | Value | Output Script |
| $x$ | $<Sig_{PK_0}> <PK_0>$ | 0 | OP_FALSE OP_RETURN 0x4d494f54 <Command data> |
| | | | |

Figure 5b

| Tx1 (complete) | | | |
|---|---|---|---|
| Inputs | | Outputs | |
| Value | Input Script | Value | Output Script |
| $x$ | $<Sig_{PK_0}> <PK_0>$ | 0 | OP_FALSE OP_RETURN 0x4d494f54 <Command data> |
| $> 0$ | $<Sig_{PK_1}> <PK_1>$ | $x$ | OP_DUP OP_HASH160 $<H_{160}(PK_1)>$ OP_EQUALVERIFY OP_CHECKSIG |

Figure 6a

| Tx1 (partial) |||| 
|---|---|---|---|
| Inputs || Outputs ||
| Value | Input Script | Value | Output Script |
| $x$ | $<Sig_{PK0}>\ <PK_0>$ | 0 | `OP_FALSE OP_RETURN 0x4d494f54`<br>`<Command data>` |
|  |  | $x + \delta$ | `OP_DUP OP_HASH160` $<H_{160}(PK_1)>$<br>`OP_EQUALVERIFY OP_CHECKSIG` |

Figure 6b

| Tx1 (complete) ||||
|---|---|---|---|
| Inputs || Outputs ||
| Value | Input Script | Value | Output Script |
| $x$ | $<Sig_{PK0}>\ <PK_0>$ | 0 | `OP_FALSE OP_RETURN 0x4d494f54`<br>`<Command data>` |
| $> \delta$ | $<Sig_{PK1}>\ <PK_1>$ | $x$ | `OP_DUP OP_HASH160` $<H_{160}(PK_1)>$<br>`OP_EQUALVERIFY OP_CHECKSIG` |

Figure 8

| Outputs | |
|---|---|
| Value | Script |
| 0 | OP_FALSE OP_RETURN OP_PUSHDATA1 <payload length> < 0x4d494f54 - MIOT protocol identifier (4 bytes) 0x01 - Payload type (1 byte) 0x00000001 - MIOT software version number (4 bytes) 0x3dd5dfac...32 - Device ID (32 bytes) 0x234a3789...22 - Device Pubkey 0x4d348912...87 - Device certificate location data (40 bytes) 0x3ad21fac - Command/message (4 bytes) 0x5665b456 - Status (4 bytes) 0x5665b456 - Prev. Status (4 bytes) > |
| y | OP_DUP OP_HASH160 $<H_{160}(PK)>$ OP_EQUALVERIFY OP_CHECKSIG |

MULTI-LAYER COMMUNICATION NETWORK

CROSS REFERENCE TO RELATED APPLICATIONS

This application is the U.S. National Stage of International Application No. PCT/EP2021/060506 filed on Apr. 22, 2021, which claims the benefit of United Kingdom Patent Application No. 2007191.6, filed on May 15, 2020, the contents of which are incorporated herein by reference in their entireties.

TECHNICAL FIELD

The present disclosure relates to controlling devices of a layered network using blockchain transactions.

BACKGROUND

A blockchain refers to a form of distributed data structure, wherein a duplicate copy of the blockchain is maintained at each of a plurality of nodes in a distributed peer-to-peer (P2P) network (referred to below as a "blockchain network") and widely publicised. The blockchain comprises a chain of blocks of data, wherein each block comprises one or more transactions. Each transaction, other than so-called "coinbase transactions", points back to a preceding transaction in a sequence which may span one or more blocks up until one or more coinbase transactions. Coinbase transactions are discussed below. Transactions that are submitted to the blockchain network are included in new blocks. New blocks are created by a process often referred to as "mining", which involves each of a plurality of the nodes competing to perform "proof-of-work", i.e. solving a cryptographic puzzle based on a representation of a defined set of ordered and validated pending transactions waiting to be included in a new block of the blockchain. It should be noted that the blockchain may be pruned at a node, and the publication of blocks can be achieved through the publication of mere block headers.

The transactions in the blockchain are used to perform one or more of the following: to convey a digital asset (i.e. a number of digital tokens), to order a set of journal entries in a virtualised ledger or registry, to receive and process timestamp entries, and/or to time-order index pointers. A blockchain can also be exploited in order to layer additional functionality on top of the blockchain. Blockchain protocols may allow for storage of additional user data or indexes to data in a transaction. There is no pre-specified limit to the maximum data capacity that can be stored within a single transaction, and therefore increasingly more complex data can be incorporated. For instance this may be used to store an electronic document in the blockchain, or audio or video data.

Nodes of the blockchain network (which are often referred to as "miners") perform a distributed transaction registration and verification process, which will be described in detail below. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g. a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the blockchain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e. a number of tokens. The detection and rejection of invalid transactions is enforced by the actions of competing nodes who act as agents of the network and are incentivized to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e. a reference) to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

SUMMARY

Internet of Things (IoT) technology enables networks of physical devices to monitor events and exchange data without human intervention. Motivating the development of IoT technology is the necessity for real-time data collection and automatic control mechanisms for replacing conventional monitoring and control methods across a wide-range of industries. IoT systems generate large volumes of data and rely on systems with network scalability, strong cybersecurity, reliable connectivity and minimal network latency.

A traditional IoT network typically has a single master IoT node or device that issues commands to other nodes or device on the network. For instance, the IoT network may have a network topology designed such that the master node can monitor activity throughout the network including communications between all nodes within the hierarchy. However, a single master node introduces a single-point-of-failure. For instance, a disruption to the master node such that the master node is prevented from issuing and receiving transactions can prevent the rest of the network being monitored and/or controlled. It would therefore be desirable to avoid this single point of failure.

According to one aspect disclosed herein, there is provided a computer-implemented method of controlling devices of a layered network using blockchain transactions, wherein the layered network (LN) comprises a plurality of LN nodes arranged in an ordered set of layers, the ordered set of layers comprising, in order, a core layer comprising a plurality of master nodes each connected to one or more blockchain nodes of a blockchain network, one or more intermediate layers comprising a respective set of intermediate nodes, and a device layer comprising a set of end devices, wherein each master node is configured to control a respective subset of intermediate nodes, a first master node being configured to control a first subset of intermediate nodes and a second master node being configured to control a second subset of intermediate nodes, and wherein each intermediate node is configured to control a respective subset of end devices; wherein the method is performed by a first master node and comprises: identifying one or more issues affecting control of at least one of the second subset of intermediate nodes by the second master node; and in response, issuing a respective command transaction to said at least one of the second set of intermediate nodes to control that node.

The nodes of the network (referred to hereinafter as IoT nodes) act as a bridge between the layered network (e.g. an IoT network) and the blockchain network. That is, the IoT nodes of the layered network are part of the IoT network and can form a connection to blockchain nodes of the blockchain network. This allows IoT nodes to connect both to the IoT network (e.g. to communicate with other IoT nodes and devices) and to the blockchain network (e.g. to transmit transactions to the blockchain nodes and to obtain transactions published on the blockchain). In some examples, one or more of the devices of the layered network may also connect to a blockchain node of the blockchain network.

Together, the IoT nodes of the layered network operate a decentralised IoT communication protocol using blockchain transactions. The blockchain network allows enables high capacity and low fee microtransaction throughput, thus allowing IoT nodes and devices to be connected reliably and at a global scale, while communicating at minimal costs. By combining a multilevel control hierarchy and a blockchain based communication protocol, the request and communication protocol provides for: large scale communication using low-fee microtransactions, integration of value transfer and control into one platform, low barriers to entry for IoT network devices, secure timestamped storage of IoT communication data, and IoT data accessible for auditing and performance monitoring.

The layered network comprises at least two independent master IoT nodes. This configuration distributes the amount of control that a single master IoT node has, thus eliminating the single-point-of-failure within the IoT network. Each master IoT node, under normal operating conditions, is responsible for a respective subset of the IoT network, i.e. each master IoT node is configured to primarily control a respective set of intermediate IoT nodes and therefore a respective subset of end devices. In accordance with the invention, when a defect with a master IoT node is detected, another master IoT node can act as back-up to take over control of the defected master IoT node's subset of intermediate IoT nodes.

According to one aspect disclosed herein, there is provided a system comprising a layered network, wherein the layered network comprises a plurality of LN nodes arranged in an ordered set of layers, the ordered set of layers comprising, in order, a core layer comprising a plurality of master nodes each connected to one or more blockchain nodes of a blockchain network, one or more intermediate layers comprising a respective set of intermediate nodes, and a device layer comprising a set of end devices, wherein: each master node is configured to control a respective subset of intermediate nodes; a first master node is configured to control a first subset of intermediate nodes; a second master node is configured to control a second subset of intermediate nodes; and each intermediate node is configured to control a respective subset of end devices.

BRIEF DESCRIPTION OF THE DRAWINGS

To assist understanding of embodiments of the present disclosure and to show how such embodiments may be put into effect, reference is made, by way of example only, to the accompanying drawings in which:

FIGS. 5a and 5b schematically illustrate partial and complete command transactions;

FIGS. 6a and 6b schematically illustrate alternative partial and complete transactions;

FIG. 8 illustrates an example command data format;

DETAILED DESCRIPTION OF EMBODIMENTS

Example System Overview

Figure 1:
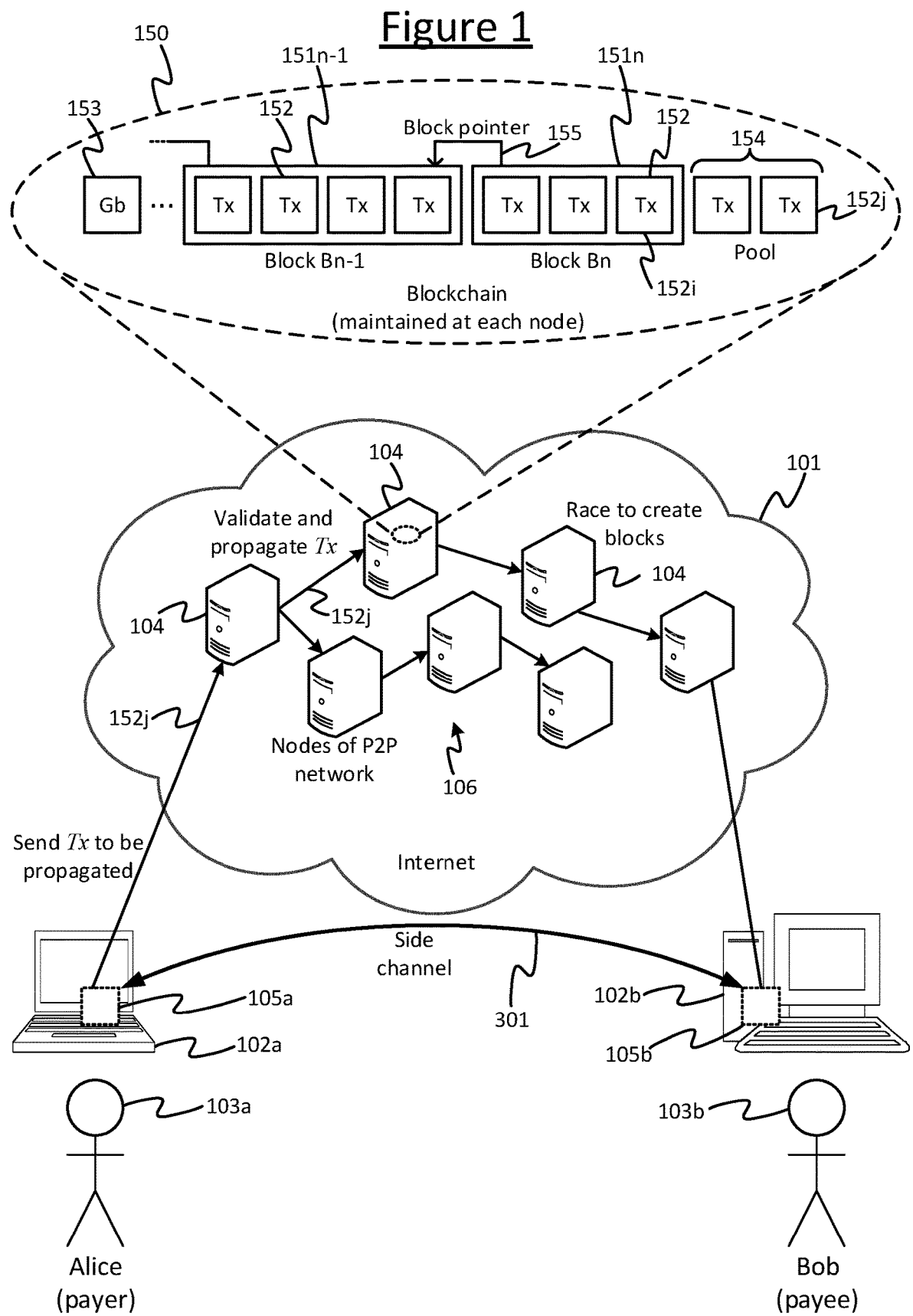
FIG. 1 is a schematic block diagram of a system for implementing a blockchain.

FIG. 1 shows an example system 100 for implementing a blockchain 150. The system 100 may comprise of a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as Application Specific Integrated Circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 160. As mentioned above, maintaining a copy of the blockchain 150 does not necessarily mean storing the blockchain 150 in full. Instead, the blockchain 150 may be pruned of data so long as each blockchain node 150 stores the block header (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set 154 of transactions 152 waiting to be incorporated into blocks 151. The ordered set 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152$j$, the (or each) input comprises a pointer referencing the output of a preceding transaction 152$i$ in the sequence of transactions, specifying that this output is to be redeemed or "spent" in the present transaction 152$j$. In general, the preceding transaction could be any transaction in the ordered set 154 or any block 151. The preceding transaction 152$i$ need not necessarily exist at the time the present transaction 152$j$ is created or even sent to the network 106, though the preceding transaction 152$i$ will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152$i$, 152$j$ be created or sent out-of-order (see discussion below on orphan transactions). The preceding transaction 152$i$ could equally be called the antecedent or predecessor transaction.

The input of the present transaction 152$j$ also comprises the input authorisation, for example the signature of the user 103$a$ to whom the output of the preceding transaction 152$i$ is locked. In turn, the output of the present transaction 152$j$ can be cryptographically locked to a new user or entity 103$b$. The present transaction 152$j$ can thus transfer the amount defined in the input of the preceding transaction 152$i$ to the new user or entity 103$b$ as defined in the output of the present transaction 152$j$. In some cases a transaction 152 may have multiple outputs to split the input amount between multiple users or entities (one of whom could be the original user or entity 103$a$ in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when an entity, such as a user or machine, 103 wishes to enact a new transaction 152$j$, then the entity sends the new transaction from its computer terminal 102 to a recipient. The entity or the recipient will eventually send this transaction to one or more of the blockchain nodes 104 of the network 106 (which nowadays are typically servers or data centres, but could in principle be other user terminals). It is also not excluded that the entity 103 enacting the new transaction 152$j$ could send the transaction to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152$j$ matches the expected signature, which depends on the previous transaction 152$i$ in an ordered sequence of transactions 152. In such an output-based transaction protocol, this may comprise checking that the cryptographic signature or other authorisation of the entity 103 included in the input of the new transaction 152$j$ matches a condition defined in the output of the preceding transaction 152$i$ which the new transaction assigns, wherein this condition typically comprises at least checking that the cryptographic signature or other authorisation in the input of the new transaction 152$j$ unlocks the output of the previous transaction 152$i$ to which the input of the new transaction is linked to. The condition may be at least partially defined by a script included in the output of the preceding transaction 152*i*. Alternatively it could simply be fixed by the blockchain node protocol alone, or it could be due to a combination of these. Either way, if the new transaction 152*j* is valid, the blockchain node 104 forwards it to one or more other blockchain nodes 104 in the blockchain network 106. These other blockchain nodes 104 apply the same test according to the same blockchain node protocol, and so forward the new transaction 152*j* on to one or more further nodes 104, and so forth. In this way the new transaction is propagated throughout the network of blockchain nodes 104.

In an output-based model, the definition of whether a given output (e.g. UTXO) is assigned is whether it has yet been validly redeemed by the input of another, onward transaction 152*j* according to the blockchain node protocol. Another condition for a transaction to be valid is that the output of the preceding transaction 152*i* which it attempts to assign or redeem has not already been assigned/redeemed by another transaction. Again if not valid, the transaction 152*j* will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered set 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered set of transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151*n* pointing back to the previously created block 151*n*−1 in the chain. A significant amount of effort, for example in the form of hash, required to create a proof-of-work solution signals the intent of the first IoT node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the ordered set of yet to be published transactions 154 at any given time, depending on when they started searching for a solution or the order in which the transactions were received. Whoever solves their respective puzzle first defines which transactions 152 are included in the next new block 151*n* and in which order, and the current set 154 of unpublished transactions is updated. The blockchain nodes 104 then continue to race to create a block from the newly defined outstanding ordered set of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to assign an accepted amount of the digital asset in a new special kind of transaction which distributes a defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction". It typically forms the first transaction of the new block 151*n*. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151*n* in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network but do not participate in validating, constructing or propagating transactions and blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system 100, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152j, it handles it in accordance with the blockchain node protocol and its respective role. This comprises first checking whether the newly received transaction 152j meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152*j* passes the test for being deemed valid (i.e. on condition that it is "validated"), any blockchain node 104 that receives the transaction 152*j* will add the new validated transaction 152 to the ordered set of transactions 154 maintained at that blockchain node 104. Further, any blockchain node 104 that receives the transaction 152*j* will propagate the validated transaction 152 onward to one or more other blockchain nodes 104 in the network 106. Since each blockchain node 104 applies the same protocol, then assuming the transaction 152*j* is valid, this means it will soon be propagated throughout the whole network 106.

Once admitted to the ordered set of transactions 154 maintained at a given blockchain node 104, that blockchain node 104 will start competing to solve the proof-of-work puzzle on the latest version of their respective ordered set of transactions 154 including the new transaction 152 (recall that other blockchain nodes 104 may be trying to solve the puzzle based on a different ordered set of transactions 154, but whoever gets there first will define the ordered set of transactions that are included in the latest block 151. Eventually a blockchain node 104 will solve the puzzle for a part of the ordered set 154 which includes Alice's transaction 152*j*). Once the proof-of-work has been done for the ordered set 154 including the new transaction 152*j*, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

UTXO-Based Model

Figure 2:
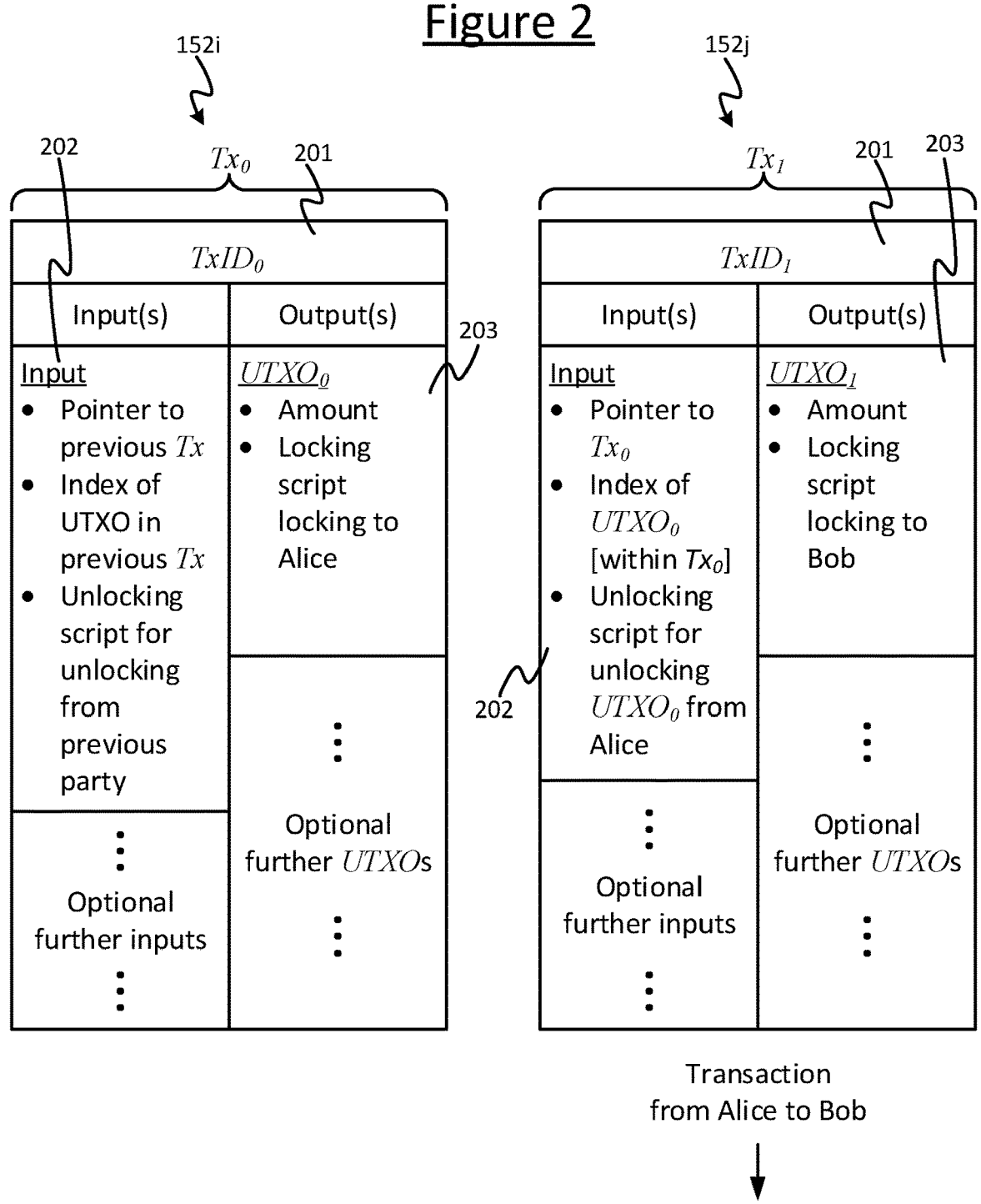
FIG. 2 schematically illustrates some examples of transactions which may be recorded in a blockchain.

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments.

Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103*a* wishes to create a transaction 152*j* transferring an amount of the digital asset in question to Bob 103*b*. In FIG. 2 Alice's new transaction 152*j* is labelled "$Tx_1$". It takes an amount of the digital asset that is locked to Alice in the output 203 of a preceding transaction 152*i* in the sequence, and transfers at least some of this to Bob. The preceding transaction 152*i* is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>||[Checksig $P_A$]

where "||" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered set of transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node that publishes her transaction 104. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction.

E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that publishes the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_. . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

As shown in FIG. 1, the client application on each of Alice and Bob's computer equipment 102a, 120b, respectively, may comprise additional communication functionality. This additional functionality enables Alice 103a to establish a separate side channel 301 with Bob 103b (at the instigation of either party or a third party). The side channel 301 enables exchange of data separately from the blockchain network. Such communication is sometimes referred to as "off-chain" communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 301 may be used to exchange any other transaction related data, such as keys, negotiated amounts or terms, data content, etc.

The side channel 301 may be established via the same packet-switched network 101 as the blockchain network 106. Alternatively or additionally, the side channel 301 may be established via a different network such as a mobile cellular network, or a local area network such as a local wireless network, or even a direct wired or wireless link between Alice and Bob's devices 102a, 102b. Generally, the side channel 301 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 301. Note therefore that if it is said that Alice and Bob exchange certain pieces of information or data, or such like, over the side channel 301, then this does not necessarily imply all these pieces of data have to be send over exactly the same link or even the same type of network.

Internet of Things

IoT is the extension of the internet into everyday physical devices and objects. Embedded with computational processing power and internet connectivity, devices can communicate and interact with each other and can be remotely monitored and controlled. Over time the definition of IoT has evolved due to machine learning, real-time analytics and the convergence of multiple technologies, although it is generally accepted that systems of devices that can support wireless sensor networks and/or control systems are likely to enable IoT.

IoT systems face several challenges. For instance, the scalability and cost of such systems may prohibit IoT systems reaching their full potential. When connected and controlled in a centralized way IoT devices require back-end infrastructures for transmitting data and receiving control commands. These back-end infrastructures are hosted either on third-party cloud services or on-premise server farms. The scalability of the IoT solutions is then determined by the scalability of the back-end servers and data centres which can reach prohibitively high operating costs of the IoT service providers. As a result, many proposed IoT solutions are not cost effective and are unsuitable for use in every-day scenarios. Performance measurements such as network latency will also become a significant factor determining the rate of IoT adoption.

Another challenge facing IoT systems is the trade-off between automation and control. IoT solutions are designed to enable remote access and control to everyday electronic devices. Most IoT solutions strike a balance between full user control and automated communication between devices and other IoT solution components. In the cases where either the device or the IoT system malfunctions, safety measures such as an override mechanism need to be in place.

Another challenge is the threat from cyber-attacks. By enabling the automated control of devices over the internet, users expose themselves to potential security risks which come in two forms, one is privacy risk incurred by transmitting IoT device metadata over the internet. For example, if eavesdroppers gain access to data from devices such as home appliances, patterns in device use could be used by criminals e.g. burglars to predict when a person is at home. The second risk is the possibility of attackers or other third parties gaining control of the IoT devices. For performance critical control software, such as that used to operate heavy machinery or dangerous goods, an attack could have catastrophic consequences.

IoT systems can either be designed to be centralised or decentralised and/or hybrid. Centralised solutions suffer from bottlenecks but can enable faster and more reliable control by privileged components in the IoT system. Decentralised reporting of state updates enables IoT solutions to be more scalable. Edge computing can help reduce network latency for critical applications, lower the dependence of IoT systems on the cloud and provide better management of the large amounts of IoT data. The rise of decentralised processing highlights the opportunities in systems architecture to better harness the benefits of centralised and distributed architectures. A hybrid system that combines a centralised and distributed system within hierarchical control structures may enhance user safety and usability purposes.

Figure 3:
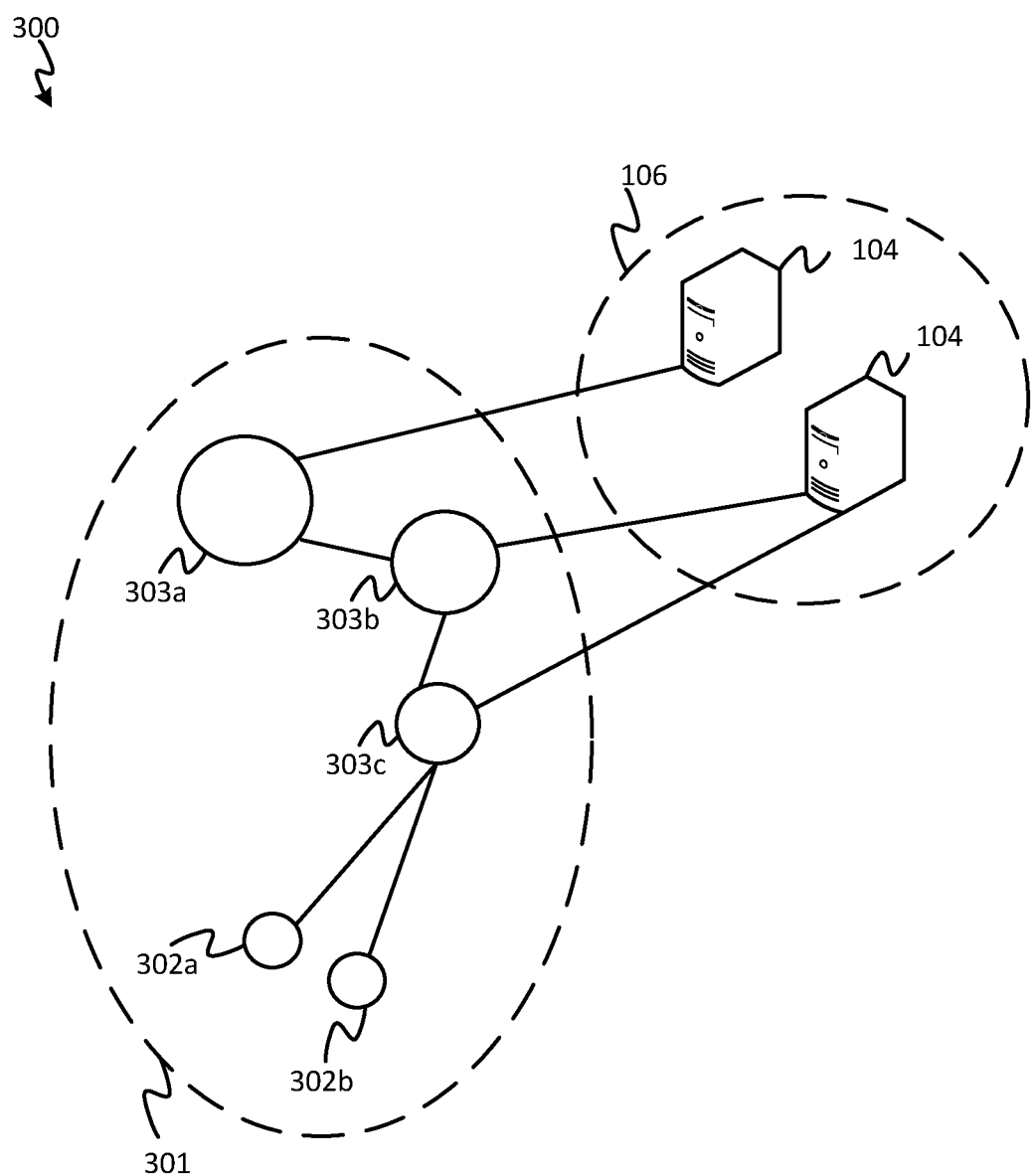
FIG. 3 schematically illustrates the overlap between an IoT network and a blockchain network.

FIG. 3 illustrates an example system 300 for implementing embodiments of the present disclosure. The example system 300 comprises a first network of one or more end devices (i.e. computing devices) 302 and one or more IoT nodes 303 (i.e. computing devices which run a blockchain client application 105 and therefore can form a first network layered over the blockchain network 106). For clarity, the first network will be referred to as an IoT network, i.e. a network of computing devices interconnected by the Internet. Typically the end devices 302 and IoT nodes 303 are embedded in everyday devices. An end device 302 may take one of a variety of forms, e.g. user devices (e.g. smart TVs, smart speakers, toys, wearables, etc.), smart appliances (e.g. fridges, washing machines, ovens, etc.), meters or sensors (e.g. smart thermostats, smart lighting, security sensors, etc.). Similarly, an IoT node 303 may also take a variety of forms, which may include, but is not limited to, the same forms as which an end device may take. An IoT node 303 may also take the form of dedicated server equipment, a base station, an access point, a router, and so on. In some examples, each device may have a fixed network (e.g. IP) address. For instance, one, some or all of the end devices may be a stationary device (e.g. a smart light, or smart central heating controller, etc.), as opposed to a mobile device.

The IoT network is a packet-switched network 101, typically a wide-area internetwork such as the Internet. The IoT nodes 303 and devices 302 of the packet-switched network 101 are arranged to form an overlay network within the packet-switched network 101. Each IoT node 303 comprises respective computer equipment, each comprising respective processing apparatus comprising one or more processors, e.g. one or more central processing units (CPUs), accelerator processors, application specific processors and/or field programmable gate arrays (FPGAs). Each IoT node 303 also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

Each IoT node 303 of the IoT network operates a blockchain client application 105. Each IoT node 303 of the IoT network is configured to control an end device 302 either directly or indirectly. An IoT node 303 that is directly connected to an end device 302 can directly control that device. An IoT node 303 that is not directly connected to an end device 302 can only indirectly control that device, e.g. by forwarding a control message to the end device via one or more intermediate IoT nodes. Each IoT node 303 is connected to one or more blockchain nodes 104.

FIG. 3 also illustrates a network 304 of blockchain nodes 104 which is a subset of the blockchain network 106.

As shown in FIG. 3, the IoT nodes 303 form part of both the IoT network and the blockchain network 106, whereas the blockchain nodes 104 form part of only the blockchain network 106. Whilst the end devices 302 are shown in FIG. 3 as forming part of only the IoT network, it is not excluded that the end devices 302 could also connect to blockchain nodes 104.

Figure 4:
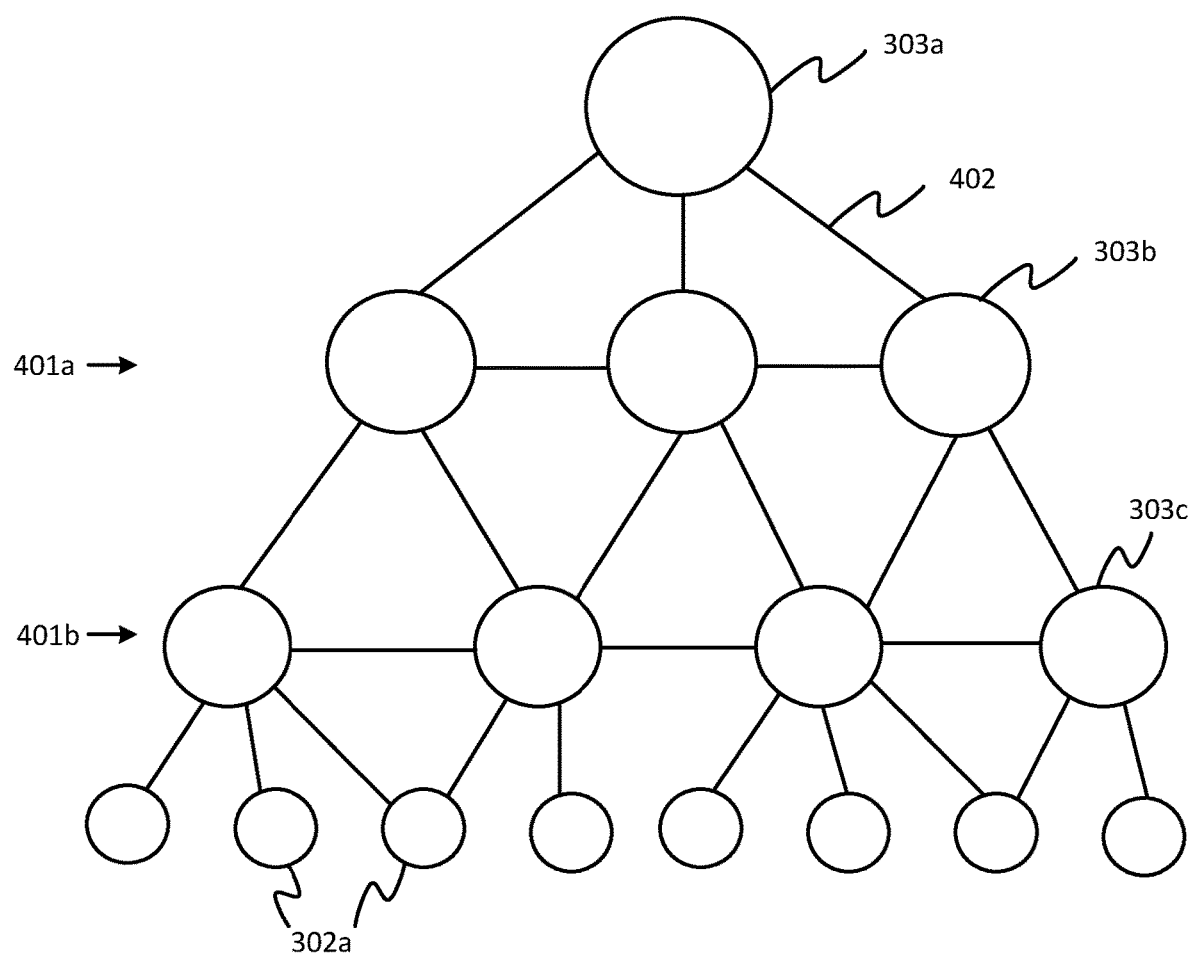
FIG. 4 schematically illustrates a hierarchical network topology.

FIG. 4 illustrates an example IoT network topology. The IoT network may control a master IoT node 303a, one or more sets 401 of one or more intermediate IoT nodes 303b, 303c, and a set of end devices 302. The master IoT node 302a is configured to control one or more intermediate IoT nodes 303b, 303c. If the IoT network comprises multiple sets (e.g. layers) 401a, 401b of intermediate IoT nodes, the master IoT node 303a is configured to directly control the first set (layer) 601a of intermediate IoT nodes (e.g. a layer of "server nodes" 303b) and to indirectly control one or more further sets (layers) 401 of intermediate IoT nodes (e.g. a layer of "slave nodes" 303c). The master IoT node 303a has the ability (i.e. permission) to override and control server and slave nodes. Each server node 303b has the ability to control slave nodes 303c. Each slave node 303c is a node under the control of the server nodes 303b and the master IoT node 303a. As an example, to instruct end device 302a, the master IoT node 303a would issue a command to slave node 303c via servant node 303b.

Whilst the example IoT network of FIG. 4 shows only two layers of intermediate IoT nodes (server nodes and slave nodes), other examples may comprise one or more further sets of intermediate IoT nodes, e.g. between the master IoT node 303a and server nodes 303b, and/or between the server nodes 303b and slave nodes 303c. As shown, each IoT node is connected to one or more other nodes via a respective connection 402, and each end device 302 is connected to one or more slave nodes via a respective connection 402. One or more nodes (e.g. the master IoT node) are referred to below as controlling nodes.

The IoT network nodes 303 may correspond to hierarchies in scope of functionality, in superiority of instructions/prerogatives, and/or in span of access. In some implementations, a hierarchical set of SPV nodes implement an "IoT controller" with three levels of hierarchy, corresponding to the master 303a, server 303b and slave nodes 303c of FIGS. 3 and 4. The master IoT node 303a instructs one or more server nodes 303b, and each server node instructs one or more slave nodes 303c. Each slave node 303c receives instructions from one or more server nodes 303b. Every slave node 303c communicates with one or more IoT end-devices 302, and these are the direct channels of communication between the IoT-controller 303 and the IoT end-devices 302. The states of execution of the IoT controller 303 are recorded in blockchain transactions Tx. Each IoT node—master, server, or slave—has the capacity to create and broadcast corresponding transactions Tx to the blockchain network 106. Each slave node monitors for trigger and/or confirmation signals from end-devices 302, and every IoT node 303 has the capacity to interact with any other IoT node with the purpose of executing the overall logic of the IoT controller.

The master IoT node, server node(s) and slave node(s) can each independently connect to nodes 104 on the blockchain network 106, operate a blockchain client application 105. The master IoT node 303a is configured to monitor the activity of other IoT nodes both directly and indirectly under their control, issue commands to these other IoT nodes in the form of blockchain transactions Tx and respond to alerts. The server node 303b is configured to watch multiple addresses, including addresses not directly controlled by the server node 303b. Server nodes 303b can be commanded to perform actions by a master IoT node 303a. The slave node 303c is configured to monitor the activities of end devices 302 directly under their control. Slave nodes 303c are under the direct command of server nodes 303b and can also be commanded to perform actions by the master IoT node 303a. The slave nodes 303c act as gateway nodes for the end devices 302 (i.e. a gateway between the end device and the blockchain network 106). The end device 302 is configured to connect to nearby slave devices. They report on end device state using an off-chain messaging protocol.

Note that whilst a distinction is made between an IoT node 303 and an end device 302 in that end devices 302 are controlled by IoT nodes 303 but do not themselves control IoT nodes 303, an end device 302 may also connect to a blockchain node 104 of the blockchain network 106. That is, in some examples an end device 302 may operate a blockchain client application 105.

The IoT network strikes a balance between centralisation and decentralisation by combining a command and control hierarchy with use of a blockchain network infrastructure. Users of the network may create their own multilevel control hierarchy which includes client-server as well as peer-to-peer relationships between devices. The network architecture comprises two layers: an IoT network, and a blockchain network 104. The blockchain network 106 acts as backend infrastructure and there is an overlap between the IoT network and the blockchain network 106.

Request & Response Protocol

IoT nodes 303 of the IoT network 303 may operate according to a communication protocol wherein the IoT nodes 303 use blockchain transactions Tx to issue command requests, instruct devices based on those command requests and issue command acknowledgements. Whilst embodiments will be described with respect to an IoT network, in general, the teaching of the present disclosure could be applied to any network comprising network entities 303 which operate a blockchain client application 105, and end devices controllable by at least a subset of those network entities.

A first IoT node 303 of the IoT network (e.g. master IoT node 303a, or server node 303b) generates a first transaction $Tx_1$ which comprises an input signed by the first IoT node and an output comprising command data. The command data comprises an identifier of an end device 302 to be controlled and a command message for controlling the end device 302. The first IoT node may be the originator of the command. That is, the first IoT node may generate the command data.

The first IoT node may transmit the first transaction $Tx_1$ to a second IoT node 303 of the first network (e.g. slave node 303c) that controls the end device 302. The first transaction $Tx_1$ may be transmitted off-chain, i.e. without being transmitted to the blockchain. For instance, the first transaction $Tx_1$ may be sent directly from the first IoT node to the second IoT node, e.g. over the internet. For example, the first IoT node may be a server node 303b and the second IoT node may be a slave node 303c. Alternatively, the first transaction $Tx_1$ may be sent indirectly, e.g. via one or more intermediate IoT nodes. As an example, the first transaction $Tx_1$ may be sent from a master IoT node 303a to a slave node 303c via a server node 303b. The second IoT node may be connected to the end device 302 via a wired or wireless connection, e.g. via an Ethernet or Wi-Fi connection.

Additionally or alternatively, the first IoT node may transmit the first transaction $Tx_1$ to the blockchain network 106 to be published on the blockchain 150. This relies on the first transaction $Tx_1$ being a valid transaction. As discussed below, in some cases it is preferable not to transmit the first transaction $Tx_1$ to the blockchain 150.

The second IoT node may obtain the first transaction $Tx_1$ directly or indirectly from the first IoT node, e.g. the first transaction $Tx_1$ may be forwarded to the second IoT node via one or more intermediate IoT nodes. The second IoT node uses the command data to transmit a control instruction to the end device 302 identified by the device identifier ("Device ID") in the command data. The control message in the command data may define a desired action of the end device 302. The control message may be configured to cause the second IoT node to transmit a particular one of several possible instructions to the end device 302. Alternatively, the second IoT node may be configured to send a single instruction to the end device 302, i.e. the second IoT node only ever sends the same instruction to the end device. This may be the case, for instance, if the end device 302 is a simple device like a sensor, and the instruction is a request for a sensor reading.

The command (i.e. the instruction for the end device) may be transmitted to the device off-chain over a wired or wireless connection, e.g. using Wi-Fi. Alternatively, if the device is also a node of the network, the command may be transmitted via a blockchain transaction Tx.

In some embodiments, a request and response cycle for device and controller communication may be implemented by the first and second IoT nodes. The request (command) is issued as a partially complete transaction containing an output which comprises the command data (e.g. an OP_FALSE OP_RETURN payload). The response (acknowledgment of the command) is the broadcasting of a finalised transaction containing the signature of both the requester and responder nodes. Transaction malleability enables this method of communication as the message receiver can add inputs and outputs whilst unable to alter the command data (e.g. the OP_FALSE OP_RETURN payload).

The first transaction $Tx_1$ transmitted from the first IoT node to the second IoT node may be transmitted without a second output. I.e. the transaction comprises a single output (the output comprising the command data). In order to complete the partial transaction, the second may update the transaction by adding an input and an output to the first transaction. The input comprises a signature of the second IoT node, i.e. a signature generated using a private key of the second node. The output is an output locked to a public key of the second IoT node, e.g. a P2PKH output. To unlock a P2PKH output, an input of the spending transaction must comprise a public key such that the hash (e.g. OP_HASH160) of the public key matches the public key hash in the P2PKH output. A P2PKH output challenges the a party attempting to unlock the output to provide two items: a public key such that the hash of the public key matches the address (hash) in the P2PKH output, and a signature that is valid for the public key and the transaction message, not necessarily in that order. The public key may correspond to the private key used to generate the signature. Alternatively, the signature may be linked to a first public key, and the output may be locked to a different public key. The second IoT node may then transmit the completed transaction to the blockchain network 106. The completed transaction (referred to as a command transaction in these embodiments) is published on the blockchain 150 for other IoT nodes to obtain, and acts as a record of the command carried out by the device. That is, once a transaction is broadcast, an independent observer can see which public key issued the command/message and which public key responded to it.

FIGS. 5a and 5b illustrate an example partial first transaction $Tx_1$ (partial) and an example updated first transaction $Tx_1$ (complete). The partial first transaction comprises a single input and a single output. The updated first transaction includes an input and an output added by the second IoT node. A SIGHASH_SINGLE signature type can be used to achieve the desired level of transaction malleability. For example, an IoT node with public key $PK_0$ sends an instruction to an IoT node with public key $PK_1$. The instruction is encoded in an unspendable output (e.g. an OP_FALSE OP_RETURN output) of a transaction signed using SIGHASH_SINGLE signature type. The partially complete transaction is valid. On completion of the instruction, the second IoT node with $PK_1$ adds an output locked to their public key. The second IoT node with $PK_1$ then finalises the transaction by signing the entire transaction using SIGHASH_ALL signature type.

In alternative embodiments, the first transaction $Tx_1$ transmitted from the first IoT node to the second IoT node may be transmitted with a second output. The second output is locked to a public key of the second IoT node. For example, the second output may be a P2PKH to the second IoT node's public key.

In order to complete the first transaction $Tx_1$, the second IoT node updates the first transaction by adding an input to the first transaction. The first transaction $Tx_1$ now includes two inputs and two outputs. The second input comprises a public key of the second IoT node. The public key in the second input may or may not be the same as the public key to which the second output is locked. Once completed, the updated first transaction (referred to as a command transaction in these embodiments) is sent to the blockchain network 106 to be published on the blockchain 150. Once a command transaction is broadcast any independent observer can see which public key issued the command/message and which public key responded to it.

The second output locked to the public key of the second IoT node may assign an amount of the digital asset which is greater than the amount of the digital asset referenced by the first input of the first transaction. In that case, the first transaction $Tx_1$ is a partially complete transaction that would not be deemed valid by the blockchain nodes 104. That is, the first transaction $Tx_1$ would not satisfy the consensus rules followed by the blockchain nodes 104 and thus would not be published in a block 151 of the blockchain 150. When updating the first transaction $Tx_1$, the second IoT node would have to ensure that the combined amount of digital asset referenced by the first and second inputs is greater than the amount of the digital asset locked to the second output.

FIGS. 6a and 6b illustrate an example partial first transaction $Tx_1$ (partial) and an example updated first transaction $Tx_1$ (complete). The first transaction includes the command data in a first output and a second output locked to the public key of the second IoT node. The updated first transaction includes the additional input added by the second IoT node. If the first IoT node with $PK_0$ sends an instruction to the second IoT node with $PK_1$ that they want carried out by the second IoT node with $PK_1$ only, they can send a partially complete transaction which locks both outputs but does not pay a transaction fee (and therefore is unlikely to be included in a block 151 by a blockchain node 104). In order to redeem the digital asset locked to $PK_1$, the second IoT node with $PK_1$ will need to provide an input that covers the transaction fee. To issue a command using a partially complete transaction, the SIGHASH flag for $<Sig_{PK_0}>$ is set to SIGHASH_ANYONECANPAY and contains an OP_FALSE OP_RETURN output with the command data. This means that, whilst the command data included in the first output is fixed, anyone can add an additional input. The public key that received the command can add an additional input to redeem the digital tokens in the input 801a. To secure the new input and prevent further transaction malleability the receiver of the tokens adds a minimal value (dust) input and signs the transaction outputs using SIGHASH_ALL.

Note that a SIGHASH flag is a flag added to signatures in transaction inputs to indicate which part of the transaction the signature signs. The default is SIGHASH_ALL (all parts of the transaction other than the ScriptSig are signed). The unsigned parts of the transaction can be modified.

Figure 7:
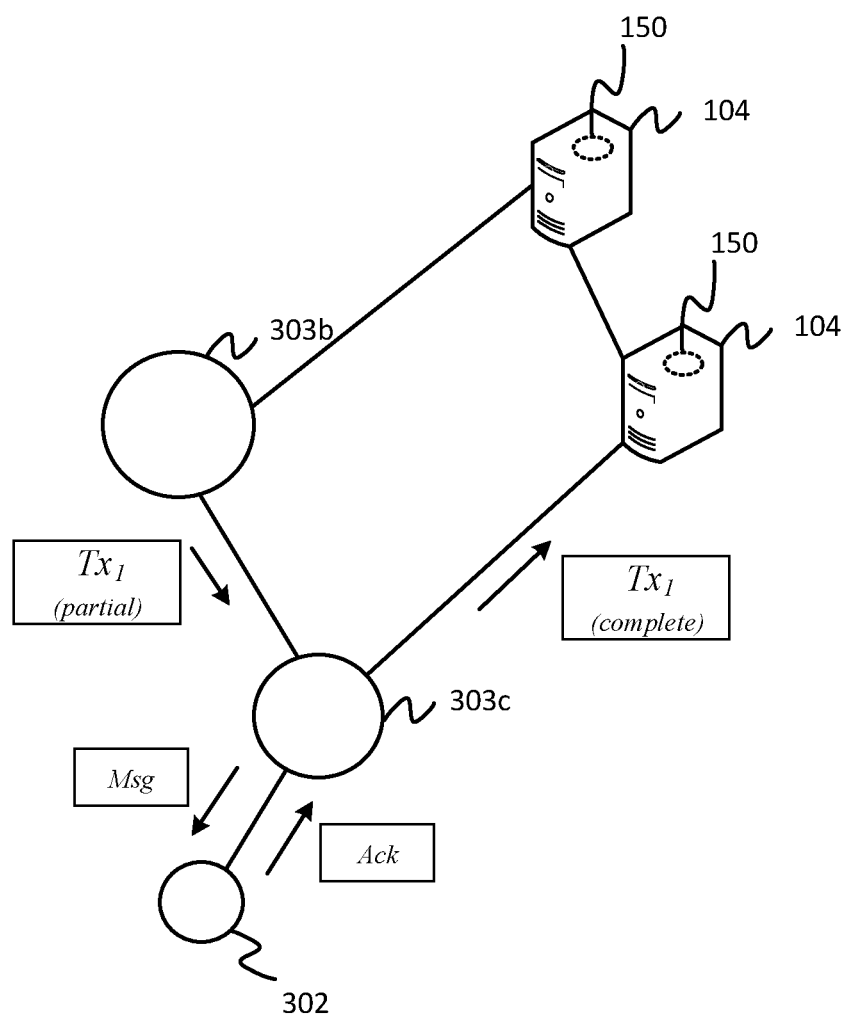
FIG. 7 schematically illustrates a command request and response cycle.

An example request and response algorithm is provided below, with reference to FIG. 7. A controlling device 303b is configured to communicate with other IoT nodes on the ioT network and can calculate the shortest route of communication to any other IoT node on the IoT network. For example, $PK_{serv}$ identifies that $PK_{slave}$ is the nearest controller to a device with device_ID.

Step 1: A controlling device 303b with public key $PK_{serv}$ sends a partial command $Tx_1$ to a second controlling device 303c with public key $PK_{slave}$. The IoT message contained in the transaction specifies the command and target device with device_ID.

Step 2: The second controlling device ($PK_{slave}$) checks that the signature for the transaction is valid and that the message contained within the IoT message payload is valid in accordance with the rules of the network.

Step 3. The second controlling device ($PK_{slave}$) sends a command message ("Msg") to the device (device_ID) via off chain communication (e.g. wired connection, Bluetooth, IP-to-IP).

Step 4: Upon completion of the command requested action, the device (device_ID) sends a command completion or acknowledgment message ("ack") back to the second controlling device ($PK_{slave}$).

Step 5: The second controller ($PK_{slave}$) adds a second input and signature and finalises the transaction. This will signal that the second controller confirms the completion of the command.

Step 6: The second controller ($PK_{slave}$) broadcasts the finalised transaction to the blockchain network 106.

FIG. 8 illustrates an example command data output of a command transaction. The first command transaction comprises an input (not shown) that comprises a signature of an IoT node 303 and an output comprising the command data. In this example, following the protocol identifier (4 bytes) is a ninety-three-byte payload containing IoT communication information. The communication information includes a thirty-two-byte device ID of the intended recipient of the command instruction, the location of the device certificate, commands and the device status. In some examples, every transaction that issues a new command or status update must follow this format or it will be considered an invalid command. If a field is not necessary for any on-chain message, its bytes may be set to 0x00000000. Preferably, as discussed below, the payload data itself will be encrypted.

The payload data can then only be accessed by parties that hold the decryption keys. The table below describes the fields of an example IOT message payload. Note that the particular sizes (in bytes) of the data fields used here are exemplary and non-limiting.

| Field size (bytes) | Description | | Data type | Comments |
|---|---|---|---|---|
| 4 | IOT protocol identifier | | uint32_t | Prefix indicating the IOT protocol |
| 1 | Payload type | | uint16_t | Single-byte identifier indicating whether the message is a regular IOT message or a certificate. |
| 4 | Software version number | | uint32_t | IOT version number (necessary for protocol updates/upgrades) |
| 32 | Device ID | | char[32] | The unique device ID for the device subject to the command/message |
| 40 (32 + 4 + 4) | Device certificate location | TXID | char[32] | Transaction ID of the transaction containing the device certificate |
| | | VOUT | uint16_t | Revocation UTXO location within certificate TX |
| | | VOUT | uint16_t | Output number of the certificate payload |
| 4 | Command/message | | uint32_t | String encoding the command or message directed to the device w/device ID |
| 4 | Status | | uint16_t | The current device status |
| 4 | Previous Status | | uint16_t | The device's most recent previous status |

A device state replica is the logical representation of a device's reported state, or desired state. Within the IoT message the device state information is encoded in the Device ID, Status and Prev. Status. The latest transaction relating to the device ID represents the current device status. The messages containing commands, responses and data related to the status of devices are contained in timestamped blocks 150 on the blockchain 150.

In summary, nodes 303 on the IoT network communicate directly using transactions containing IoT command data, as well as by connecting to the blockchain network 106 to broadcast transactions. The blockchain 150 is used as a permanent data store for recording commands and status updates from IoT network components as well as issuing reports and alerts related to IoT devices 302.

Layered Network

A layered network (LN) is an overlay network layered on top of a communication channel. For instance, the communication channel may be an underlying infrastructure network such as a personal area network, a local area network (e.g. an inter-company P2P network) or a wide area network such as the internet. In other examples, the layered network may be a network of LN nodes connected via wired connections. In yet other examples, the connections may be wireless connections, e.g. Bluetooth or Wi-Fi connections. In some examples, some or all of the above example connections may be used to form the layered network.

Some or all of the LN nodes of the network may be configured to connect to (i.e. join or re-join) the layered network according a connection protocol. The connection protocol may vary according to the particular layer of the network in which the connecting node is connecting to (i.e. attempting to join or re-join). Before the connection protocol is described in detail, a series of example layered networks that may be created, or enforced, by the connection protocol will be described. However it will be appreciated that these are only illustrative examples, and in general any layered network that obeys the connection protocol may be created.

Figure 9:
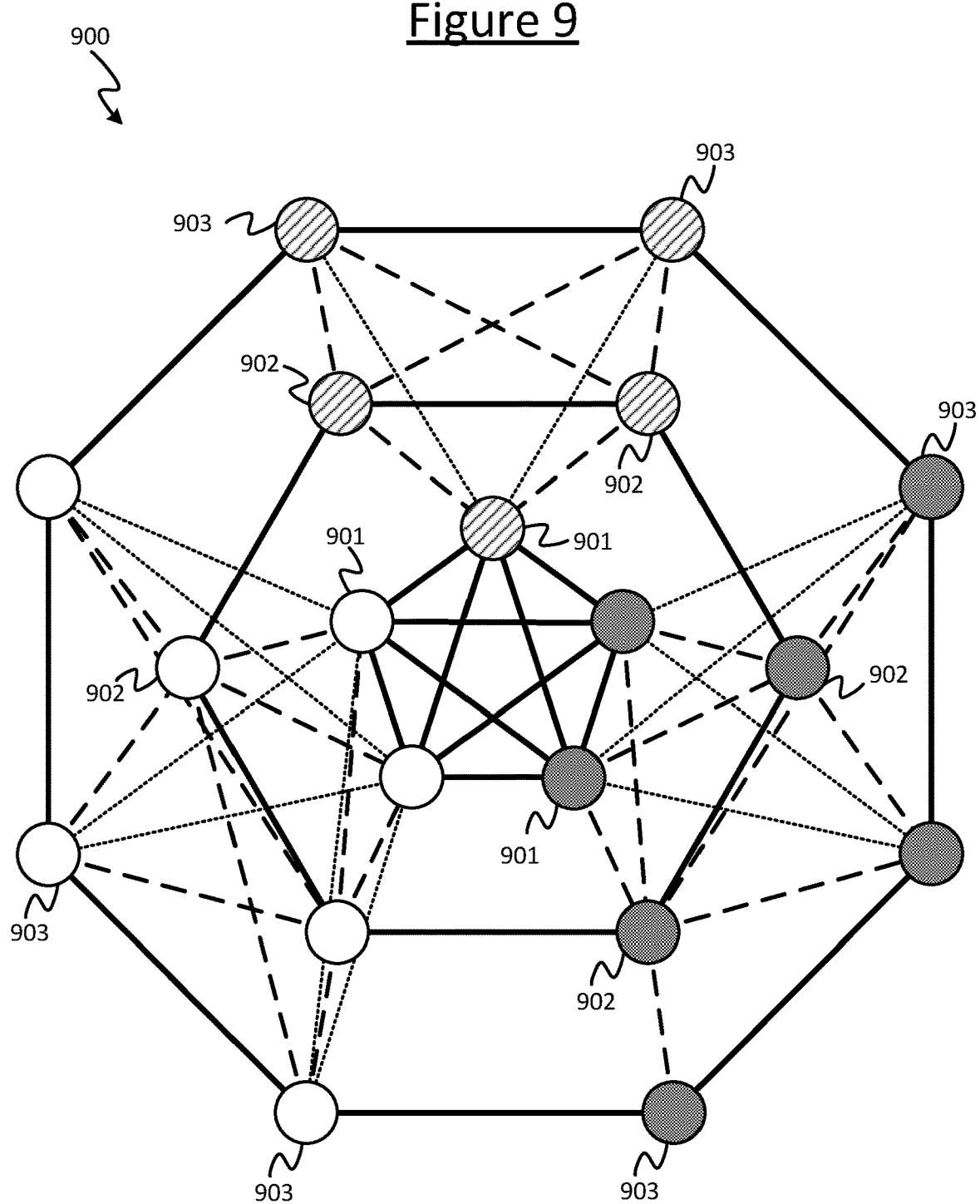
FIG. 9 is a schematic representation of an example of a layered network.
Figure 11:
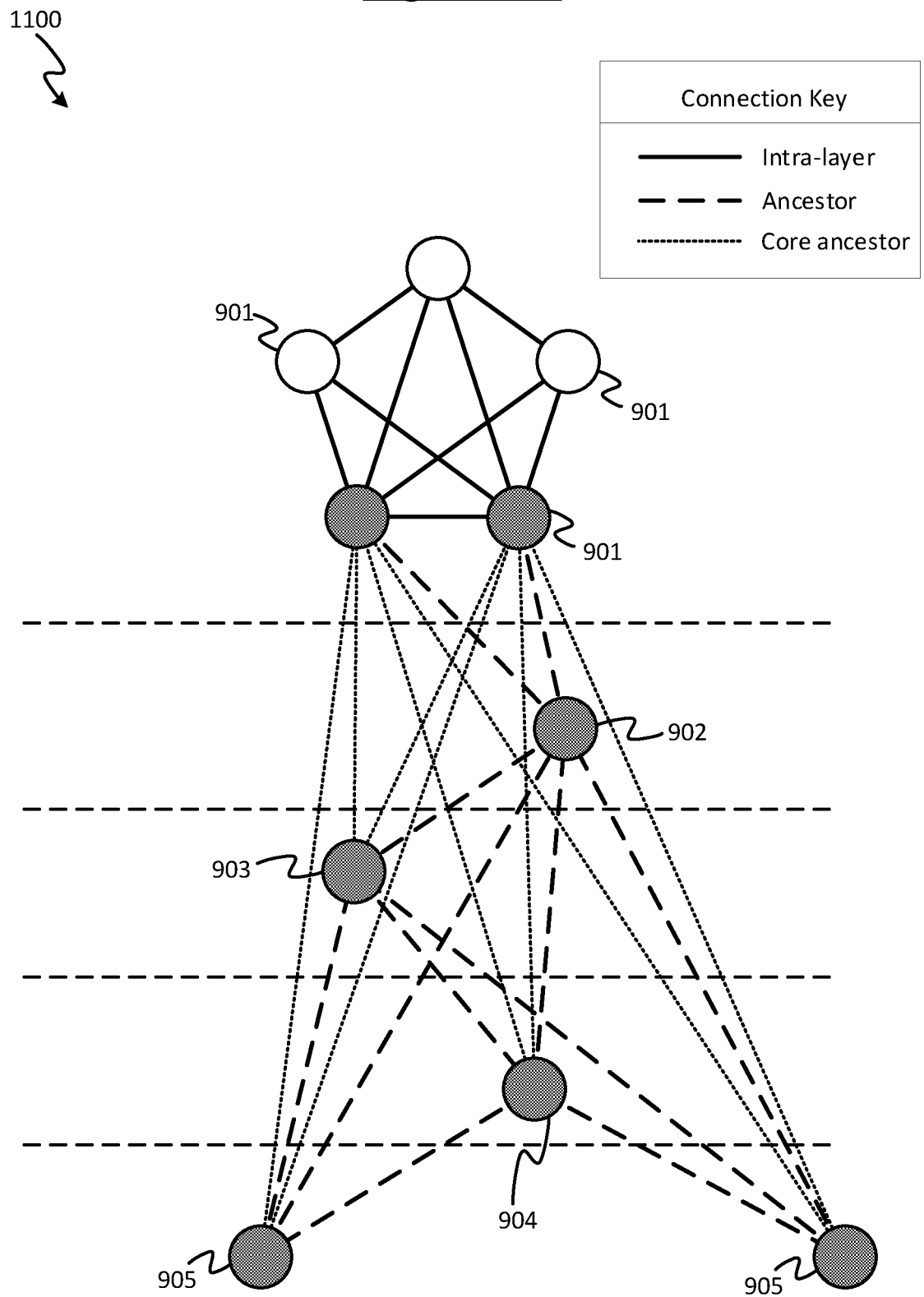
FIG. 11 is another schematic representation of an example of a layered network.
Figure 12:
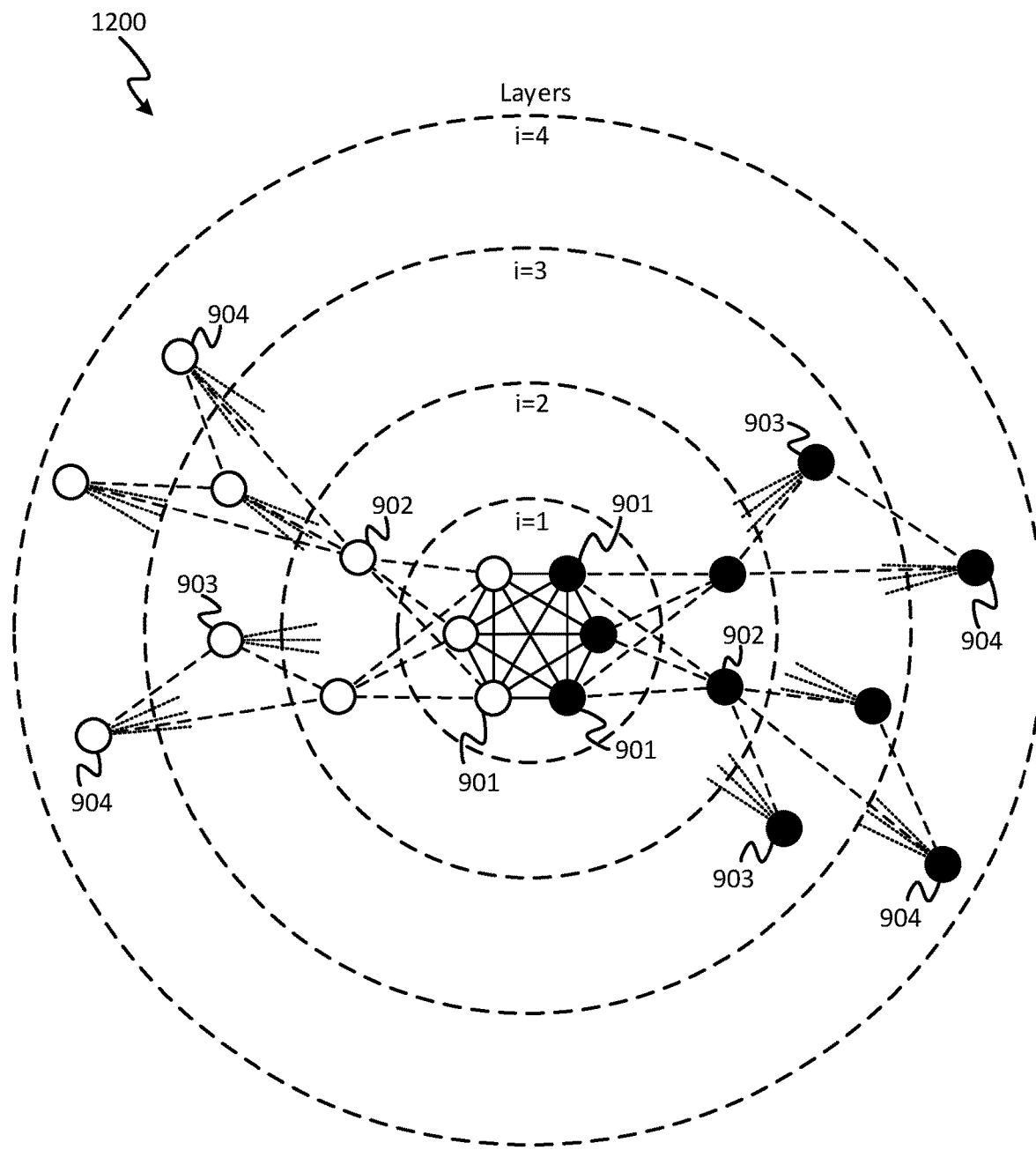
FIG. 12 is another schematic representation of an example of a layered network.

FIG. 9 illustrates a schematic representation of an example of a layered network (LN) 900. In general, a LN includes a core network (or core layer) made up of core LN nodes 901, and a series of layers (or shells). The core layer is also referred to as the first layer of the LN. The series of layers extend outward of the core layer, in order, from a second layer made up of second LN nodes 902, to one or more outer layers. Each outer layer is made up of a set of outer LN nodes 903. Only one outer layer is shown in FIG. 9 but it will be appreciated that a LN may comprise any number of outer layers. As a particular example, FIG. 11 illustrates an example of a LN 1100 comprising five layers, and FIG. 12 illustrates an example of a LN 1200 comprising four layers.

The example LN 900 of FIG. 9 comprises five core LN nodes 901, six second LN nodes 902 and eight outer LN nodes 903. In some LNs 900, the number of LN nodes may increase with each layer, i.e. the core layer is made up of the least number of LN nodes and the outermost layer is made up of the greatest number of LN nodes. In other examples, one or more of the layers between the core layer and outermost layer may be made up of the greatest number of LN nodes. In this example, the core layer is the innermost layer of the LN 900, the second layer is an intermediate layer and the outer layer, being the only outer layer, is the outermost layer.

The core layer (a network within the LN) in this example forms a complete graph, i.e. each core LN node 901 is connected to each other core LN node 901. For a core layer of five core LN nodes 901, in the example given the core layer requires ten distinct core connections (i.e. a connection between two core LN nodes). In other examples (e.g. FIG. 10), the core layer may not be a complete graph. The core layer may form a "near-complete graph". In a near-complete graph, at least one core LN node 901 is not connected to at least one other core LN node 901. It may be that only one core connection is missing. In a particular example of a near-complete graph, each core LN node 901 may be connected to one or more but not all of the other core LN nodes 901.

The second layer comprises second LN nodes 902. Note that the term "second LN node" is used only as a label for LN nodes 902 that are situated, by construction, in the second layer of the LN 900. Each second LN node 902 is connected to at least one core LN node 901. In some examples, each second LN node 902 may be connected to only one core LN node 901. Alternatively, some or all of the second LN nodes 902 may be connected to more than one core LN node 901. For instance, some or all of the second LN nodes 902 may connect to each and every one of the core LN nodes 901. In the example LN 900 of FIG. 9, each core LN node 901 is connected to two second LN nodes 902. However, in this example, some second LN nodes 902 (those shown as striped circles) are connected to one core LN node 901, whilst some second LN nodes 902 (those shown as white circles, and those shown as shaded circles) are connected to two core LN nodes 901. Second LN nodes 902 (and outer LN nodes 903 of outer layers) that are connected to the same core LN nodes 901 are referred to as a "community". For instance, each white node together forms one community, each striped node together forms a community, and each shaded node together forms yet another community. Connections between the second LN nodes 902 and the core LN nodes 901 are referred to as "ancestor connections" and are shown as wide dotted lines.

In the example of FIG. 9, each second LN node 902 is connected to two other second LN nodes 902. In some examples, some or all of the second LN nodes 902 may not form connections with other second LN nodes, e.g. some second LN nodes 902 may be connected to other second LN nodes 902 whilst some second LN nodes may be connected to other second LN nodes 902. These "intra-layer" connections are shown as solid lines between nodes in FIG. 9.

The outer layer of FIG. 9 comprises outer LN nodes 903. Note that the term "outer" in "outer layer" here does not in itself necessarily limit to the outermost layer of the LN network as a whole, though that is one possibility. Each outer LN node 903 is connected to at least one second LN node 902. In some examples, each outer LN node 903 may be connected to only one second LN node 902. Alternatively, some or all of the outer LN nodes 903 may be connected to more than one second LN node 902. For instance, some or all of the outer LN nodes 903 may connect to each and every one of the second LN nodes 901. In the example LN 900 of FIG. 9, each outer LN node 903 is connected to two second LN nodes 902. Some second LN nodes 902 (i.e. the striped nodes) are connected to two outer LN nodes 903, and some second LN nodes 902 (i.e. the white nodes and shaded nodes) are connected to three outer LN nodes 903.

In the example of FIG. 9, each outer LN node 903 is connected to two other outer LN nodes 903 of the same layer. In some examples, some or all of the outer LN nodes 903 may not form any connections with other outer LN nodes 903 of the same layer. Some or all of the outer LN nodes 903 may form at least one connection with another outer LN node 903 of the same layer.

As well as being connected to at least one second LN node 902, each outer LN node 903 is also connected to at least one core LN node 901. A connection between an outer LN node 903 and a core LN node 901 is referred to as a "core ancestor connection" and is shown as a thin dotted lines. Each outer LN node 903 may be connected to each of the core LN nodes 901 that their ancestral second LN node(s) 902 is/are connected to. As shown in FIG. 9, each outer LN node 903 may be connected to each of the core LN nodes 901 that their ancestral second LN node(s) 902 is/are connected to, and to no other core LN nodes 901. In this case, each outer LN node 903 belongs to a single community.

Figure 10:
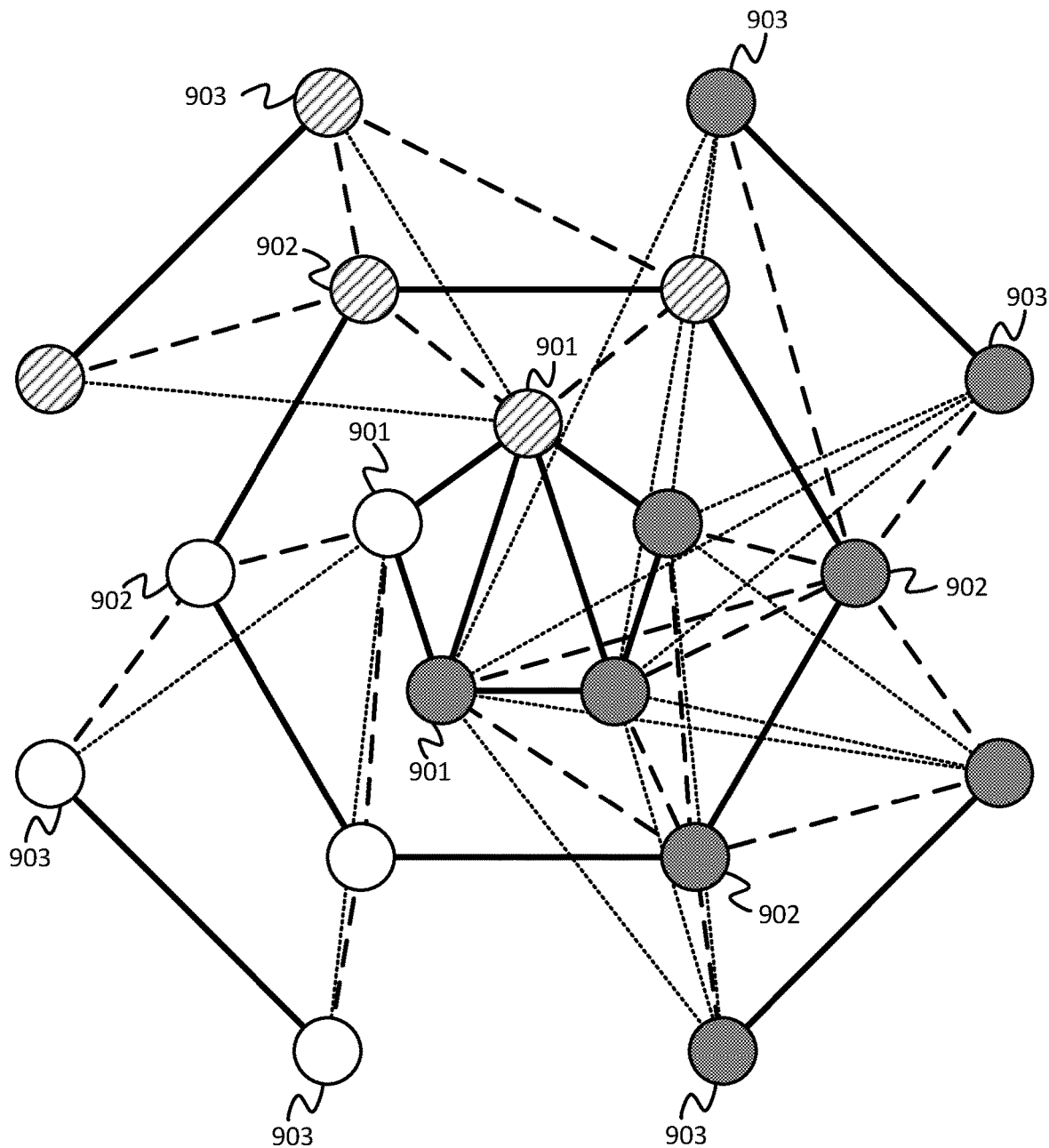
FIG. 10 is another schematic representation of an example of a layered network.

FIG. 10 illustrates a schematic representation of another example of a LN 1000. Like the LN 900 of FIG. 9, the example LN 1000 comprises a core layer, a second layer and an outer layer. These example LNs 900, 1000 share the same number of LN nodes (i.e. five core LN nodes 901, six second LN nodes 902 and eight outer LN nodes 903), but include a different number of connections. For instance, in this example the core layer is not a complete graph as some connections between core LN nodes 901 are not present. Another difference is that two communities (white nodes and shaded nodes) comprise a single core LN node 901, whilst another community (shaded nodes) comprises three core LN nodes 901. Yet another difference is that the degree of LN nodes in the outer shell of LN 400 is now one, unlike the degree of nodes in the outer shell of LN 900 which is two. That is, in this example LN 1000, each outer LN node 903 is connected to a single other outer LN node 903. Therefore the LN nodes of different layers have a different degree.

FIG. 11 illustrates a schematic representation of another example of a LN 1100. In this example, only some core LN nodes 901 are connected to second LN nodes and outer LN nodes 903. That is, in this example some core n LN odes 901 only form connections with other core LN nodes 901. Therefore in this example the LN 900 comprises a single community (shaded nodes). The LN 900 of his example comprises five layers: a core layer, a second layer, and three outer layers. The core layer is made up of five core nodes 901 that form a near-complete graph. In this example of a near-complete graph, only a single core connection is missing. The second layer is made up of a single second LN node 902 which is connected to two core LN nodes 901. The second layer is made up of a single second LN node 902 which is connected to two core LN nodes 901. The third layer is made up of a single outer LN node 903 which is connected to the second LN node 902 via an ancestor connection. The outer LN node 903 of the third layer is also connected to the two core LN nodes 901 that the second LN node 902 is connected to. The outer LN node 903 is connected to the two core LN nodes 901 via respective core ancestor connections. The fourth layer is also made up of a single outer LN node 904. The outer node 904 of the fourth layer is connected to the outer LN node 903 of the third layer, via an ancestor connection, and to the second LN node 902, via an ancestor connection. The outer LN node 904 of the fourth layer is also connected to the two core LN nodes 901 that the second LN node 902 and the outer LN node 903 of the third layer are connected to. The outer LN node 904 is connected to the two core LN nodes 901 via respective core ancestor connections. Finally, the fifth layer is made up of two outer LN nodes 905. The two outer nodes 905 of the fifth layer are connected to the outer LN node 904 of the fourth layer, and to the outer LN node 903 of the third layer, and to the second LN node 902, wherein each connection is an ancestor connection. The two outer LN nodes 905 are also connected to the two core LN nodes 901 via core ancestor connections. In this example LN 1100, the LN node of the second layer and the LN nodes of the outer layers are not connected to any other LN nodes of the same layer.

FIG. 12 illustrates a schematic representation of another example of a LN 1200. This LN comprises two communities of LN nodes, as illustrated by the white nodes and the black nodes. In this example the core layer forms a complete graph (i.e. complete network of LN nodes). Each community comprises a distinct set of three core LN nodes 901. This example LN 1200 comprises four layers (a core layer, a second layer and two outer layers). Each LN node of an outer layer is connected to one LN node in a preceding layer. Like the example LN 1100 of FIG. 11, the nodes of the second layer and the LN nodes of the outer layers are not connected to any other LN nodes of the same layer.

The LN of some embodiments of the present invention may be (or may comprise) a Mandala network, or share some but not all properties of a Mandala network. For instance, the LN may share some similar features but instead be designed to allow more flexible and desirable connectivity structures, e.g. for service and user networks that utilize the blockchain network 106.

In general, the underlying infrastructure network of the LN is the blockchain 150, and the LN is an overlay network layered on top of the blockchain 150. The LN nodes of the LN are nodes that have a connection to the blockchain network 106 (e.g. lightweight clients configured to perform a simplified payment verification (SPV) method). The outer nodes of the layer network are connected to off-chain devices. However it is not excluded that some or all of the devices may have a connection to the blockchain network 106.

The LN nodes 901, 902, 903 are configured to form connections between one another at the overlay network level. That is, the LN nodes 901, 902, 903 of the layered network are configured to obey an overlay network protocol which specifies what connections they can and cannot form with other LN nodes 901, 902, 903 of the layered network. Hence, although all the LN nodes may be (but not necessarily) physically capable of connecting to one another via the underlying infrastructure (e.g. the internet), when they are participating as LN nodes 901, 902, 903 of the layered network, operating in accordance with the relevant overlay network protocol of the layered network 900, then the connections between such LN nodes 901, 902, 903 may be more limited. A connection between two LN nodes 901, 902, 903 of the layered network 900 means those nodes can communicate directly, which in this context means without having to perform a hop via another LN node 901, 902, 903 of the layered network 900. In the context of an overlay network such as the layered network, a "connection" means a connection (i.e. edge) at the level of the layered network 900 (i.e. the level of the overlay network protocol of the layered network).

The LN nodes 901, 902, 903 of the LN 900 may identify and communicate with one another by way of digital certificates. That is, some or all of the LN nodes 901, 902, 903 may be associated with a respective digital certificate. The digital certificate includes, and attests to, an identifier of a respective LN node 901, 902, 903, e.g. a public key associated with that node, a network address (e.g. an IP address) of the node, etc. A LN node 901, 902, 903 of the LN 900 may use the digital certificate of a different node to connect to that LN node. For example, an outer LN node 903 may obtain a digital certificate from a second LN node 902 and use the identifying information of the second LN node included in the digital certificate to connect to the second LN node 902. LN nodes of a given layer may issue digital certificates to LN nodes of a next layer in the ordered set of layers, i.e. core LN nodes 901 may issue digital certificate to second LN nodes 902, second LN nodes 902 may issue digital certificates to outer LN nodes 903 of a first outer layer, and so on. In some examples, LN nodes of a given layer may issue digital certificates to LN nodes of the same layer, e.g. a second LN node 902 may issue a respective digital certificate to one or more other second LN nodes 902.

Multiple Master Nodes

Figure 13:
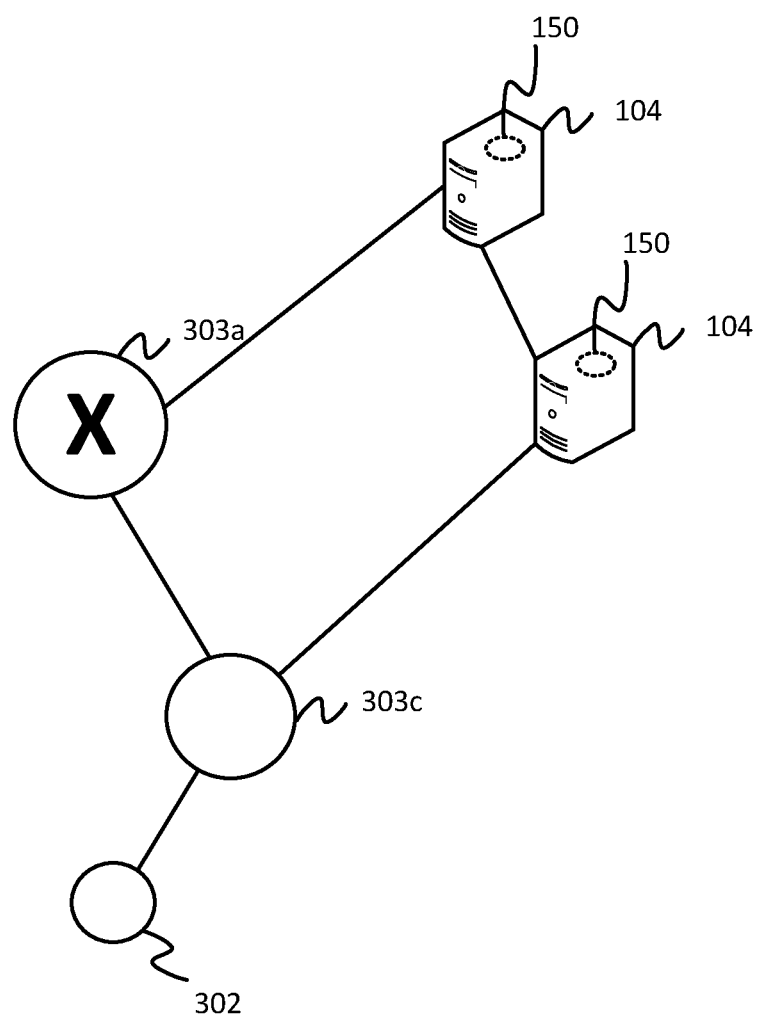
FIG. 13 schematically illustrates a faulty or compromised master node.

FIG. 13 illustrates a consequence of the example network 303 of FIG. 4. That is, if a master IoT node 303a is compromised, becomes faulty or is otherwise unable to control or monitor other IoT nodes 303 on the network 300 then the network 303 may be unable to operated as intended. For instance, a malicious party may take over the master IoT node 303a to prevent that master IoT node 303 from controlling other IoT nodes on the IoT network.

Figure 14:
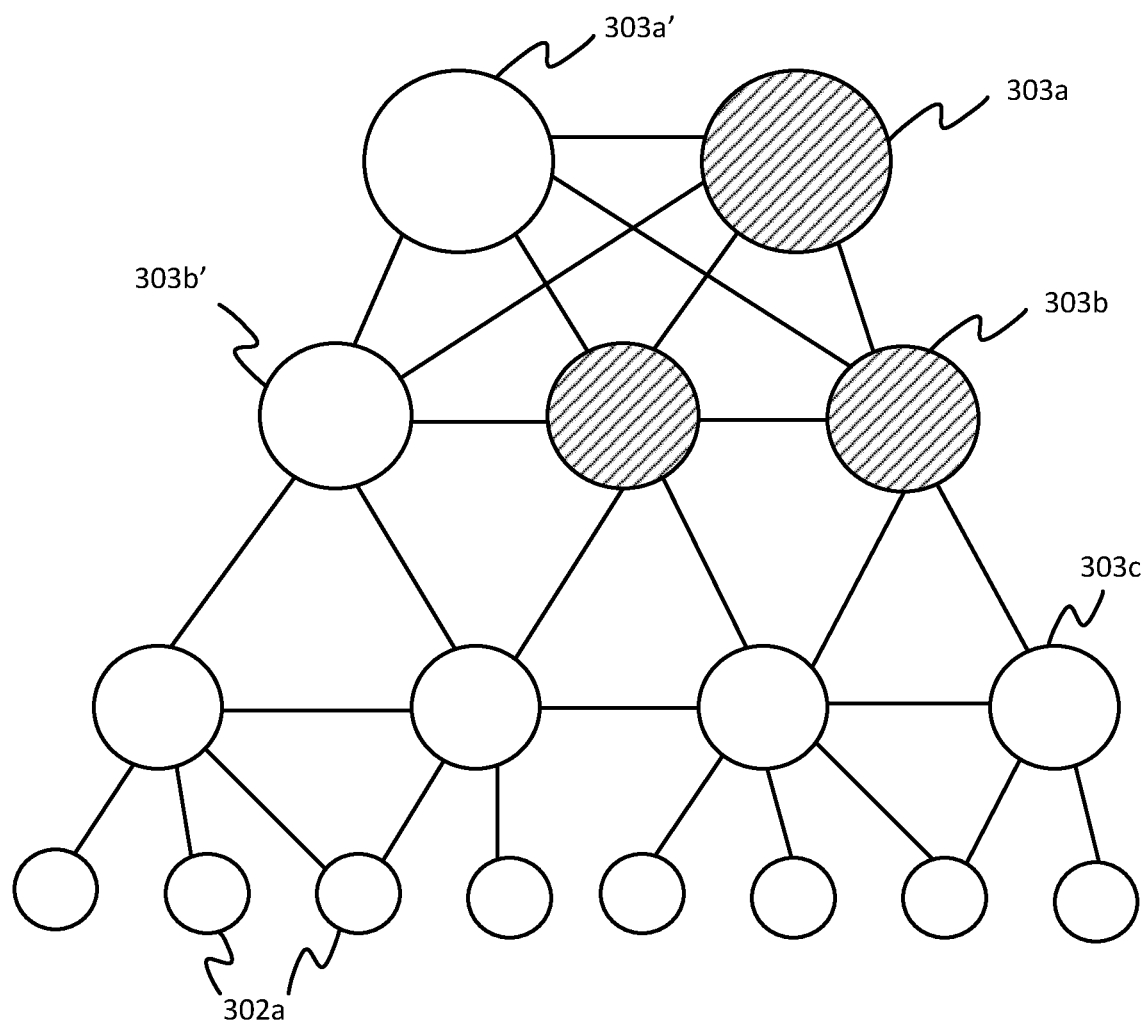
FIG. 14 schematically illustrates a layered network comprises multiple master nodes.

FIG. 14 illustrates an example network 1400 for implementing embodiments of the invention. The network is similar to that of FIG. 3 in that it comprises a plurality of IoT nodes arranged in layers (i.e. in a hierarchy defined by respective layers of the IoT network). The network 1400 differs from that of FIG. 3 in that it contains multiple master IoT nodes 303a. In this example only two master IoT nodes 303a, 303a' are shown but in general the network 1400 may comprise any number of master IoT nodes 303a. Each master IoT node is connected to and configured to control a respective set of intermediate IoT nodes. For instance, a first master IoT node 303a' (shown as a white circle) is connected to and configured to control one intermediate IoT node 303b' (also shown as a white circle), whereas a second master IoT node 303a (shown as a striped circle) is connected to two intermediate IoT nodes 303b (also shown as striped circle). As can be seen from FIG. 14, the first master IoT node 303a' is also connected to the two intermediate IoT nodes 303b controlled by the second master IoT node 303a. In some examples, the second master IoT node 303a may be connected to the intermediate IoT node 303b' controlled by the first master IoT node 303a'. Each intermediate IoT node 303b, 303b' of each intermediate layer is connected to one or more intermediate IoT nodes 303c of a next intermediate layer or to one or more end devices 302 if a device layer.

Put another way, the network 1400 is arranged as a layered network, with a core layer comprising multiple master IoT nodes 303a, and then a series of outer layers. Each of the master IoT nodes may be connected to each other master IoT node (e.g. the core layer may be a complete graph). Alternatively, the core layer may be a near-complete graph, as described above. The outer layers comprise one or more intermediate layers, each comprising one or more intermediate IoT nodes. Each master IoT node of the core layer controls, under normal operation, a respective set of intermediate IoT nodes of a first intermediate layer, i.e. the intermediate layer directly connected to the core layer. The respective set of intermediate IoT nodes controlled by the first master IoT node 303a' and the respective set of intermediate IoT nodes controlled by the second master IoT node 303a may or may not be exclusive sets (i.e. they may or may not overlap). It is also not excluded that one or more of the master IoT nodes may be connected to one or more intermediate IoT nodes in a different intermediate layer, e.g. the second intermediate layer. The layered network also comprises a device layer comprising one or more end devices. Any of the features attributed to the master IoT nodes 303a, intermediate IoT nodes 303b, 303c and end devices 302 with reference to FIGS. 3 to 8 may apply equally to the following description of those nodes and devices.

In some embodiments, the network 1400 may share one, some or all of the properties of any one of the layered networks 900, 1000, 1100, 1200 described with reference to FIGS. 9 to 12 respectively. For instance, the network 1400 may take the form of a Mandala network or share Mandala-like properties.

As shown in FIG. 13, a problem arises when a network consists of a single master IoT node 303a. This problem is addressed by the present invention by enabling a master IoT node to act as a back-up in case of an issue with a different master IoT node. For instance, the first master IoT node 303a' may take control of the intermediate IoT nodes 303b controlled by the second master IoT node 303a in case there is an issue (e.g. malfunction) with the second master IoT node 303a.

The following will be described in terms of the first master IoT node 303a' acting as a back-up for the second master IoT node 303a but it will be appreciated that in general any of the multiple master IoT nodes may perform the actions attributed to the first master IoT node 303a.

The first master IoT node 303a is configured to identify an issue (or issues) affecting the second master IoT node's ability to control its respective set of intermediate IoT nodes, i.e. the second set of intermediate IoT nodes.

For instance, the issue may be that the second master IoT node 303a is not able to control the second set of intermediate IoT nodes, e.g. by issuing command transactions to one or more of the second set of intermediate IoT nodes in accordance with the request and response protocol described above. The second master IoT node 303a may be unable to control the second set of intermediate IoT nodes due to, for example, a malfunction or other technical issue with the second master IoT node 303a, or because the second master IoT node 303a has been compromised by a malicious party.

As another example, the issue may be that the second master IoT node 303a is experiencing a load balancing issue (e.g. too much traffic across one or more connections of the network 1400). The load balancing issue may be a network-wide issue, i.e. a load across the network as a whole has surpassed a threshold amount. In that situation, the second master IoT node may have to disable one or more of its connections in order to bring the load under an allowable threshold. In other examples, the second master IoT node may receive instructions from one of the other master IoT nodes (e.g. the first master IoT node), wherein the instructions instruct the second master IoT node to drop certain connections. In some examples, the second master IoT node 303a may deal with a load balancing issue by redirecting traffic to the first master IoT node 303a', rather than dropping the connections.

The load balancing issue may be a load between the second master IoT node and a particular intermediate IoT node, or a set of intermediate IoT nodes, connected to the second master IoT node 303a. The second master IoT node may disable the connection, or connections, having the increased load, e.g. to bring the load within an allowable threshold amount. Alternatively, the second master IoT node may drop a connection with another master IoT node, e.g. in response to an instruction from that master IoT node to drop the connection.

The detecting of the load balancing issue (either by the second master IoT node itself or another node, e.g. the first master IoT node) may comprise detecting that a load on a connection(s) between the second master IoT node and one or more other nodes in the layered network exceeds a threshold. Such a load may be measured for example in terms of bandwidth, error rate, packet loss rate, delay, jitter, or a combined metric combing in one or more such measures. Alternatively or additionally, the detecting of the load balancing issue may comprise detecting that a processing load on the second master IoT node exceeds a threshold. This could be a measure, for example, in terms of a consumed processing resource of the second master IoT node, or an available processing resource of the second master IoT node.

In embodiments the detecting of the load balancing issue may comprise detecting that a number of connections between the second master IoT node and one or more other nodes (e.g. one or more of the second set of nodes) of the IoT network exceeds a threshold number of connections, e.g. a maximum number of total connections to the second master IoT node. For example, the second master IoT node may be required to keep to within a minimum or maximum number of connections allowed by a connection protocol of the network 1400.

The threshold may be a threshold for connections between the second master IoT node and nodes of a particular layer. For instance, the second master IoT node may only be allowed to form (and maintain) a certain amount of core connections, or connections to intermediate IoT nodes 303b (e.g. of a particular intermediate layer or in total across the intermediate layers). The second master IoT node may drop one or more of its connections to intermediate IoT nodes, and/or instruct one or more of its connected intermediate IoT nodes to drop their connections to the second master IoT node. The number of dropped connections may be equal to or greater than the number of connections above the threshold number of allowable connections.

In some embodiments, disabling a connection with a respective IoT node may comprise revoking a respective digital certificate issued by the second master IoT node to the respective IoT node. In these examples, an IoT node must have a valid digital certificate in order to connect with another IoT node. The second master IoT node may be responsible for issuing digital certificates to intermediate noes. The second master IoT node may revoke the digital certificate of an intermediate IoT node 303b in order to disable the connection to that node.

As another example, the issue may be a privacy issue. That is, the second master IoT node may receive an indication of (or otherwise obtain information pertaining to) a breach in privacy of the network. The privacy issue may be that the second master IoT node has been hacked or become faulty. Alternatively, the privacy issue may be that identifying information (e.g. of the second master IoT node or other nodes of the network) has been compromised (e.g. stolen or leaked). The second master IoT node 303a may drop its connections with one or more of the second set of intermediate IoT nodes to prevent further damage to the IoT network. The identifying information may comprise private and/or public keys associated with the second master IoT node 303a.

The first master IoT node 303a' may be configured to identify the issue based on an indication from one or more other nodes of the network. For instance, the first master node 303a' may receive an indication from the second master IoT node 303a, and/or from one or more of the second set of intermediate IoT nodes, e.g. those that the second master IoT node 303a is no longer able to control, or those whose control by the second master IoT node 303a has otherwise been affected. As a particular example, if the second master IoT node 303a has to disable a connection with one or more intermediate IoT nodes, the second master IoT node 303a may inform the first master IoT node 303a' of the disabled connections. The intermediate IoT nodes whose connections to the second master IoT node 303a have been disabled may, as well as or instead of the second master IoT node 303a, inform the first master IoT node 303a of the disabled connection(s). For instance, one or more of the second set of intermediate IoT nodes may request that the first master IoT node 303a' takes control of them, or of other ones of the second set of intermediate IoT nodes.

Additionally or alternatively, the first master IoT node 303a' may be configured to identify the issue based on a failed attempt to communicate with the second master IoT node 303a. In other words, the first master IoT node 303a' may determine that there is a problem with the second master IoT node 303a if the first master IoT node 303a' cannot connect to the second master IoT node 303a.

As another additional or alternative option for identifying an issue with the second master IoT node 303a, the first master IoT node 303a' may determine that the second master IoT node 303a has not issued a command transaction (e.g. as part of the request and response protocol described above) to one or more of the second set of intermediate IoT nodes for a threshold amount of time. For instance, the first master IoT node 303a' may monitor the blockchain 150 (e.g. on a periodic or ad hoc basis) for transactions issued by the second master IoT node 303a and/or sent to the intermediate IoT nodes under its control. That is, transactions signed with a signature of the second master IoT node or locked to a respective public key (or public key hash or any other blockchain address associated with a given intermediate IoT node) of a respective intermediate IoT node. If no such transactions have been issued in an expected time period (e.g. one minute, one hour, etc.) then the first master IoT node 303a' may take that as an indication that there is a problem with the second master IoT node 303a.

As another option, the first master IoT node 303a' may identify that there is a problem with the second master IoT node 303a if a status of an intermediate IoT node has not changed over a predetermined period of time. Additionally or alternatively, the first master IoT node 303a' may identify that there is a problem with the second master IoT node 303a if a status of one or more of the end devices controlled by the second set of intermediate IoT nodes has not changed over a predetermined period of time. For instance, as part of the request and response protocol, nodes and/or end devices may report their status in request and response transactions, as shown in FIG. 8. If the status of a device has not changed in a set period of time, this may indicate that an intermediate IoT node has not instructed the device to perform an action in that period of time, which in turn may indicate that the second master IoT node 303a has not instructed the intermediate IoT node to control the end device 302 within that period of time.

The first master IoT node 303a' is configured to, in response to identifying one or more of the abovementioned issues with the second master IoT node 303a, control one or more of the second set of intermediate IoT nodes. As set out above, control of a node on the network 1400 is performed by issuing command transactions. Therefore, in response to identifying an issue, the first master IoT node 303a' is configured to issue a respective command transaction to one or more of the second set of intermediate IoT nodes. In some example, a command transaction is used to each of the second set of intermediate IoT nodes. In other examples, a command transaction may only be issued to some of the second set of intermediate IoT nodes, e.g. those that the second master IoT node 303a is unable to control.

A complete description of an example request and response protocol implemented by IoT nodes of the IoT network (including the master IoT node and intermediate IoT nodes) is provided above and so will not be described in detail again other than to elaborate on specific actions that may be performed by the first master IoT node 303a'.

Each command transaction issued to one of the second set of intermediate IoT nodes may comprise an output locked to a public key of that intermediate IoT node, e.g. by way of a P2PKH output. The command transaction may also comprise one or more inputs, e.g. an input comprising a signature of the first master IoT node 303a'.

A command transaction issued to one of the second set of intermediate IoT nodes may comprise command data for controlling one or more end devices controlled by that intermediate IoT node. For instance, the command data may include a respective device identifier of the device(s) to be controlled. As explained above, the command data may be included in an unspendable output of the command transaction. However it is not excluded that the command data may be included in a spendable output, e.g. the output locked to a public key of the intermediate IoT node.

The first master IoT node 303a' may submit the command transaction(s) directly to the blockchain network 106 to be included in the blockchain 150. Additionally or alternatively, a respective command transaction(s) may be sent to a respective intermediate IoT node directly, e.g. via a secure communication channel.

In some examples, the first master IoT node 303a' may receive a request to control one of the second set of intermediate IoT nodes, e.g. in the form of a request transaction. The first master IoT node 303a' may take this as an indication that there is an issue with the second master IoT node 303a and then issue a command transaction to one or more of the second set of intermediate IoT nodes. As an example, the request transaction may be a partial transaction which the first master IoT node 303a' completes and submits to the blockchain network 106. Completing the request transaction may comprise adding an input (e.g. including a signature of the first master IoT node 303a') to the request transaction. In other examples, the request transaction may be a complete transaction with an output locked to a public key of the first master IoT node 303a', and the first master IoT node 303a' may spend that output using a command transaction to control an intermediate IoT node.

CONCLUSION

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In non-preferred embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

It will be appreciated that the above embodiments have been described by way of example only. More generally there may be provided a method, apparatus or program in accordance with any one or more of the following Statements.

Statement 1. A computer-implemented method of controlling devices of a layered network using blockchain transactions, wherein the layered network (LN) comprises a plurality of LN nodes arranged in an ordered set of layers, the ordered set of layers comprising, in order, a core layer comprising a plurality of master nodes each connected to one or more blockchain nodes of a blockchain network, one or more intermediate layers comprising a respective set of intermediate nodes, and a device layer comprising a set of end devices, wherein each master node is configured to control a respective subset of intermediate nodes, a first master node being configured to control a first subset of intermediate nodes and a second master node being configured to control a second subset of intermediate nodes, and wherein each intermediate node is configured to control a respective subset of end devices; wherein the method is performed by a first master node and comprises:
identifying one or more issues affecting control of at least one of the second subset of intermediate nodes by the second master node; and
in response, issuing a respective command transaction to said at least one of the second set of intermediate nodes to control that node.

Statement 2. The method of statement 1, wherein identifying the one or more issues comprises identifying that the second master node is unable to control said at least one of the second set of intermediate nodes.

Statement 3. The method of statement 1 or statement 2, wherein identifying the one or more issues comprises identifying a load balancing issue associated with the second master node.

Statement 4. The method of statement 3, wherein the load balancing issue comprises a load across the connection between one or more of the second set of intermediate nodes and the second master node being above a predetermined threshold.

Statement 5. The method of statement 3 or statement 4, wherein the load balancing issue comprises a load across the connections between one or more of the second set of intermediate nodes and the second master node being, as a whole, above a predetermined threshold.

Statement 6. The method of any of statements 3 to 5, wherein the load balancing issue comprise a number of connections between the second master node and the second set of intermediate nodes being above a predetermined threshold.

Statement 7. The method of any preceding statement, wherein the respective command transaction comprises a first output locked to a respective public key associated with said at least one of the second set of intermediate nodes.

Statement 8. The method of any preceding statement, wherein the respective command transaction is configured to cause said at least one of the second set of intermediate nodes to control one or more of the subset of end devices controlled by that node.

Statement 9. The method of statement 8, wherein the respective command transaction comprises respective command data, wherein the respective command data comprises a respective identifier of said one or more of the subset of end devices controlled by said at least one of the second set of intermediate nodes.

For instance, the command data may be contained in an unspendable output of the command transaction.

Statement 10. The method of any preceding statement, wherein the respective command transaction is configured to cause said at least one of the second set of intermediate nodes to transmit a respective control instruction to said one or more of the subset of end devices, wherein the respective control instruction is based on the respective command data.

The command data may be encrypted or otherwise encoded.

Statement 11. The method of any preceding statement, wherein the respective command transaction comprises a first input comprising a signature linked to a respective public key of the first master node.

Statement 12. The method of any preceding statement, wherein said issuing of the respective command transaction to said at least one of the second set of intermediate nodes comprises transmitting the respective command transaction to that node.

For instance, using an off-chain communication channel.

Statement 13. The method of any preceding statement, wherein said issuing of the respective command transaction to said at least one of the second set of intermediate nodes comprises transmitting the respective command transaction to one or more blockchain nodes to be published on the blockchain.

Statement 14. The method of any preceding statement, wherein said identifying of the one or more issues comprises:
identifying one or more issues affecting control of some or all of the second subset of intermediate nodes by the second master node; and
in response, issuing a respective command transaction to said some or all of the second subset of intermediate nodes, to control said some or all of the second subset of intermediate nodes.

Statement 15. The method of any preceding statement, wherein said identifying of the one or more issues comprises one or more of:
receiving an indication from one or more nodes of the layered network, wherein the indication indicates that the second master node is experiencing one or more issues affecting control of some or all of the second subset of intermediate nodes by the second master node;
attempting and failing to establish a connection with the second master node;
determining that a respective status of said at least one of the second set of intermediate nodes, and or one or more end device controlled by said at least one of the second set of intermediate nodes, has not changed over a predetermined time period; and/or identifying that the second master node has not issued a respective command transaction to said at least one of the second set of intermediate nodes within a predetermined time period.

The indication may be sent by one of the intermediate nodes e.g. following a prescribed threshold number of failed connections.

Statement 16. The method of statement 15, wherein identifying that the second master node has not issued a respective command transaction to said at least one of the second set of intermediate nodes within a predetermined time period comprises identifying that the respective blockchain address associated with that node has not received the respective command transaction within the predetermined time period.

Statement 17. The method of statement 15 or statement 16, wherein receiving an indication from one or more LN nodes of the layered network comprises receiving a request to control said at least one of the second set of intermediate nodes.

For instance, another one of the intermediate nodes may have sent a request to the second master node to control said at least one of the second set of intermediate nodes and that request may have gone unanswered due to the second master node being unable to control that other master node. Therefore the other intermediate node may turn to the first master node as a back-up.

Statement 18. The method of statement 17, wherein receiving the request to control said at least one of the second set of intermediate nodes comprises receiving a request transaction.

Statement 19. The method of statement 18, wherein the request transaction comprises an output locked to a respective public key associated with the first master node.

Statement 20. The method of any preceding statement, wherein the first master node is connected to a plurality of blockchain nodes of the blockchain network.

Statement 21. The method of statement 20, wherein each master node is connected to a plurality of blockchain nodes of the blockchain network.

Statement 22. The method of any preceding statement, wherein each master node is connected to each other master node.

Statement 23. The method of any preceding statement, wherein each intermediate node of a first one of the intermediate layers is connected to at least two master nodes.

Statement 24. The method of any preceding statement, wherein each intermediate node of a given layer is connected to at least one node of a preceding layer.

Statement 25. The method of any preceding statement, wherein the first and second subsets of intermediate nodes are non-overlapping subsets.

Statement 26. The method of any preceding statement, wherein the end devices are IoT devices.

Statement 27. Computer equipment comprising:
memory comprising one or more memory units;
processing apparatus comprising one or more processing units; and
a network interface comprising one or more network interface;
wherein the memory stores code arranged to run on the processing apparatus, the code being configured so as when run on the processing apparatus to operate the computer equipment by performed the method of any preceding statement.

Statement 28. A computer program embodied on computer-readable storage and configured so as when run on one or more processors to perform the method of any of statements 1 to 26.

Statement 29. A system comprising a layered network, wherein the layered network comprises a plurality of LN nodes arranged in an ordered set of layers, the ordered set of layers comprising, in order, a core layer comprising a plurality of master nodes each connected to one or more blockchain nodes of a blockchain network, one or more intermediate layers comprising a respective set of intermediate nodes, and a device layer comprising a set of end devices, wherein:
each master node is configured to control a respective subset of intermediate nodes;
a first master node is configured to control a first subset of intermediate nodes;
a second master node is configured to control a second subset of intermediate nodes; and each intermediate node is configured to control a respective subset of end devices.

According to another aspect disclosed herein, there may be provided a method comprising the actions of the first master node and some or all of the intermediate nodes.

According to another aspect disclosed herein, there may be provided a system comprising the computer equipment of the first master node and the respective computer equipment of some or all of the intermediate nodes.

The invention claimed is:

1. A computer-implemented method of controlling devices of a layered network using blockchain transactions, wherein the layered network (LN) comprises a plurality of LN nodes arranged in an ordered set of layers, the ordered set of layers comprising, in order, a core layer comprising a plurality of master nodes each connected to one or more blockchain nodes of a blockchain network, one or more intermediate layers comprising a respective set of intermediate nodes, and a device layer comprising a set of end devices, wherein each master node is configured to control a respective subset of intermediate nodes, a first master node being configured to control a first subset of intermediate nodes and a second master node being configured to control a second subset of intermediate nodes, and wherein each intermediate node is configured to control a respective subset of end devices; wherein the method is performed by a first master node of the plurality of master nodes and comprises:
identifying one or more issues affecting control of at least one of the second subset of intermediate nodes by the second master node, including identifying a load balancing issue associated with the second master node, wherein the load balancing issue comprises a load across the connection between one or more of the second set of intermediate nodes and the second master node being above a predetermined threshold; and
in response, issuing a respective command blockchain transaction to said at least one of the second set of intermediate nodes to control that node.

2. The method of claim 1, wherein identifying the one or more issues comprises identifying that the second master node is unable to control said at least one of the second set of intermediate nodes.

3. The method of claim 1, wherein the load balancing issue comprises a number of connections between the second master node and the second set of intermediate nodes being above a predetermined threshold.

4. The method of claim 1, wherein the respective command transaction comprises a first output locked to a respective public key associated with said at least one of the second set of intermediate nodes.

5. The method of claim 1, wherein the respective command transaction is configured to cause said at least one of the second set of intermediate nodes to control one or more of the subset of end devices controlled by that node.

6. The method of claim 5, wherein the respective command transaction comprises respective command data, wherein the respective command data comprises a respective identifier of said one or more of the subset of end devices controlled by said at least one of the second set of intermediate nodes.

7. The method of claim 6, wherein the respective command transaction is configured to cause said at least one of the second set of intermediate nodes to transmit a respective control instruction to said one or more of the subset of end devices, wherein the respective control instruction is based on the respective command data.

8. The method of claim 1, wherein the respective command transaction comprises a first input comprising a signature linked to a respective public key of the first master node.

9. The method of claim 1, wherein said issuing of the respective command transaction to said at least one of the second set of intermediate nodes comprises transmitting the respective command transaction to that node.

10. The method of claim 1, wherein said issuing of the respective command transaction to said at least one of the second set of intermediate nodes comprises transmitting the respective command transaction to one or more blockchain nodes to be published on the blockchain.

11. The method of claim 1, wherein said identifying of the one or more issues comprises:
identifying one or more issues affecting control of some or all of the second subset of intermediate nodes by the second master node; and
in response, issuing a respective command transaction to said some or all of the second subset of intermediate nodes, to control said some or all of the second subset of intermediate nodes.

12. The method of claim 1, wherein said identifying of the one or more issues comprises one or more of:
receiving an indication from one or more nodes of the layered network, wherein the indication indicates that the second master node is experiencing one or more issues affecting control of some or all of the second subset of intermediate nodes by the second master node;
attempting and failing to establish a connection with the second master node;
determining that a respective status of said at least one of the second set of intermediate nodes, and or one or more end device controlled by said at least one of the second set of intermediate nodes, has not changed over a predetermined time period; and/or
identifying that the second master node has not issued a respective command transaction to said at least one of the second set of intermediate nodes within a predetermined time period.

13. The method of claim 12, wherein identifying that the second master node has not issued a respective command transaction to said at least one of the second set of intermediate nodes within a predetermined time period comprises identifying that a respective blockchain address associated with that node has not received the respective command transaction within the predetermined time period.

14. The method of claim 12, wherein receiving an indication from one or more LN nodes of the layered network comprises receiving a request to control said at least one of the second set of intermediate nodes.

15. The method of claim 14, wherein receiving the request to control said at least one of the second set of intermediate nodes comprises receiving a request transaction, wherein the request transaction comprises an output locked to a respective public key associated with the first master node.

16. Computer equipment comprising:
memory comprising one or more memory units;
processing apparatus comprising one or more processing units; and
a network interface comprising one or more network interface;
wherein the memory stores code arranged to run on the processing apparatus, the code being configured so as when run on the processing apparatus, the processing apparatus operates the computer equipment to perform a method of controlling devices of a layered network using blockchain transactions, wherein the layered network (LN) comprises a plurality of LN nodes arranged in an ordered set of layers, the ordered set of layers comprising, in order, a core layer comprising a plurality of master nodes each connected to one or more blockchain nodes of a blockchain network, one or more intermediate layers comprising a respective set of intermediate nodes, and a device layer comprising a set of end devices, wherein each master node is configured to control a respective subset of intermediate nodes, a first master node being configured to control a first subset of intermediate nodes and a second master node being configured to control a second subset of intermediate nodes, and wherein each intermediate node is configured to control a respective subset of end devices;
wherein the method is performed by a first master node and comprises:
identifying one or more issues affecting control of at least one of the second subset of intermediate nodes by the second master node, including identifying a load balancing issue associated with the second master node, wherein the load balancing issue comprises a load across the connection between one or more of the second set of intermediate nodes and the second master node being above a predetermined threshold; and
in response, issuing a respective command blockchain transaction to said at least one of the second set of intermediate nodes to control that node.

17. A computer program embodied on a non-transitory computer-readable storage medium and configured so as when run on one or more processors, the one or more processors perform a method of controlling devices of a layered network using blockchain transactions, wherein the layered network (LN) comprises a plurality of LN nodes arranged in an ordered set of layers, the ordered set of layers comprising, in order, a core layer comprising a plurality of master nodes each connected to one or more blockchain nodes of a blockchain network, one or more intermediate layers comprising a respective set of intermediate nodes, and a device layer comprising a set of end devices, wherein each master node is configured to control a respective subset of intermediate nodes, a first master node being configured to control a first subset of intermediate nodes and a second master node being configured to control a second subset of intermediate nodes, and wherein each intermediate node is configured to control a respective subset of end devices; wherein the method is performed by a first master node and comprises:

identifying one or more issues affecting control of at least one of the second subset of intermediate nodes by the second master node, including identifying a load balancing issue associated with the second master node, wherein the load balancing issue comprises a load across the connection between one or more of the second set of intermediate nodes and the second master node being above a predetermined threshold; and in response, issuing a respective command blockchain transaction to said at least one of the second set of intermediate nodes to control that node.

* * * * *